United States Patent
Fuglevand et al.

(10) Patent No.: US 6,468,682 B1
(45) Date of Patent: Oct. 22, 2002

(54) ION EXCHANGE MEMBRANE FUEL CELL

(75) Inventors: William A. Fuglevand, Spokane, WA (US); Peter D. DeVries, Spokane, WA (US); Glen Alden Lloyd, Spokane, WA (US); David R. Lott, Spokane, WA (US); John P. Scartozzi, Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 0 days.

(21) Appl. No.: 09/577,407

(22) Filed: May 17, 2000

(51) Int. Cl.[7] ............................. H01M 8/02; H01M 8/04
(52) U.S. Cl. ............................. 429/26; 429/32; 429/34; 429/38
(58) Field of Search ........................ 429/30, 32, 26, 429/34, 38, 39

(56) References Cited

U.S. PATENT DOCUMENTS

| | | | |
|---|---|---|---|
| 2,852,554 A | 9/1958 | England | 260/481 |
| 3,498,844 A | 3/1970 | Sanderson | |
| 3,507,702 A | 4/1970 | Sanderson | |
| 3,528,858 A | 9/1970 | Hodgon et al. | |
| 3,554,803 A | 1/1971 | Poirier | |
| 3,623,913 A | 11/1971 | Adlhart et al. | |
| 3,808,534 A | 4/1974 | Summers et al. | 340/249 |
| 3,823,358 A | 7/1974 | Rey | 320/3 |
| 3,964,930 A | 6/1976 | Reiser | |
| 3,969,145 A | 7/1976 | Grewstad et al. | |
| 3,975,913 A | 8/1976 | Erickson | 60/645 |
| 4,024,036 A | 5/1977 | Nakamura et al. | 204/129 |
| 4,035,551 A | 7/1977 | Grevstad | 429/44 |
| 4,130,693 A | 12/1978 | Van den Berghe et al. | 429/41 |
| 4,142,024 A | 2/1979 | Van den Berghe et al. | 429/41 |
| 4,178,418 A | 12/1979 | Croset et al. | 429/27 |
| 4,185,131 A | 1/1980 | Goller et al. | 427/113 |

(List continued on next page.)

FOREIGN PATENT DOCUMENTS

| | | |
|---|---|---|
| DE | 25 51936 | 11/1975 |
| GB | 2 129237 A | 5/1984 |
| GB | 2 286 482 | 8/1995 |
| JP | 57-60670 | 4/1982 |
| JP | 57-80675 | 5/1982 |
| JP | 57-107570 | 7/1982 |
| WO | WO94/15577 | 7/1994 |
| WO | WO 001/17952 | 3/2000 |
| WO | WO 00/26980 | 5/2000 |

OTHER PUBLICATIONS

Chul–Hawan et al., Journal of Polymer Science, vol. 34, pp. 2709–2714 , (1996). (Month Unknown).

Tager et al; Polymer Science vol. 33, 1991 pp. 282–287 (Month Unknown).

Wilson et al., Private Paper 1996, 8 pages (Month Unknown).

(List continued on next page.)

*Primary Examiner*—Stephen Kalafut
(74) *Attorney, Agent, or Firm*—Wells St. John P.S.

(57) ABSTRACT

An ion exchange membrane fuel cell is described and which includes a module enclosing a membrane electrode diffusion assembly which has an active area defined by a surface area, and which produces an average current density of at least about 350 mA per square centimeter of surface area when supplied with a dilute fuel at a nominal voltage of about 0.5 volts.

94 Claims, 12 Drawing Sheets

U.S. PATENT DOCUMENTS

| | | | |
|---|---|---|---|
| 4,192,906 A | 3/1980 | Maru | 429/13 |
| 4,219,443 A | 8/1980 | Klinedinst et al. | 252/425 |
| 4,276,355 A | 6/1981 | Kothmann et al. | 429/26 |
| 4,287,232 A | 9/1981 | Goller et al. | 427/113 |
| 4,435,252 A | 3/1984 | Kadija | 204/11 |
| 4,463,065 A | 7/1984 | Hegedus et al. | 429/33 |
| 4,469,579 A | 9/1984 | Covitch et al. | 204/283 |
| 4,476,198 A | 10/1984 | Ackerman et al. | 429/32 |
| 4,478,917 A | 10/1984 | Fujita et al. | 429/33 |
| 4,500,612 A | 2/1985 | Fujii et al. | 429/26 |
| 4,510,211 A | 4/1985 | Struthers | 429/18 |
| 4,562,124 A | 12/1985 | Ruka | 429/30 |
| 4,598,028 A | 7/1986 | Rossing et al. | 429/30 |
| 4,629,537 A | 12/1986 | Hsu | 204/15 |
| 4,647,359 A | 3/1987 | Lindstrom | 204/294 |
| 4,648,955 A | 3/1987 | Maget | 204/258 |
| 4,661,411 A | 4/1987 | Martin et al. | 428/421 |
| 4,670,702 A | 6/1987 | Yamada et al. | 320/21 |
| 4,686,158 A | 8/1987 | Nishi et al. | 429/26 |
| 4,702,971 A | 10/1987 | Isenberg | 429/31 |
| 4,724,191 A | 2/1988 | Kuriakose et al. | 429/193 |
| 4,728,584 A | 3/1988 | Isenberg | 429/31 |
| 4,749,632 A | 6/1988 | Flandermeyer et al. | 429/12 |
| 4,755,376 A | 7/1988 | Marianowski | 429/16 |
| 4,767,518 A | 8/1988 | Maskalick | 204/242 |
| 4,769,296 A | 9/1988 | Sterzel | 429/12 |
| 4,769,297 A | 9/1988 | Reiser et al. | 429/17 |
| 4,770,955 A | 9/1988 | Ruhl | 429/33 |
| 4,795,536 A | 1/1989 | Young et al. | 204/129 |
| 4,795,683 A | 1/1989 | McElroy | 429/13 |
| 4,797,185 A | 1/1989 | Polak et al. | 204/129 |
| 4,797,190 A | 1/1989 | Peck | 204/296 |
| 4,804,592 A | 2/1989 | Vanderborgh | 429/33 |
| 4,816,036 A | 3/1989 | Kotchick | 29/623 |
| 4,818,637 A | 4/1989 | Molter et al. | 429/15 |
| 4,818,735 A | 4/1989 | Fujiki et al. | 501/134 |
| 4,824,741 A | 4/1989 | Kunz | 429/26 |
| 4,826,741 A | 5/1989 | Aldhart et al. | 429/19 |
| 4,826,742 A | 5/1989 | Reiser | 429/33 |
| 4,847,172 A | 7/1989 | Maskalick et al. | 429/30 |
| 4,849,253 A | 7/1989 | Maricle | 427/115 |
| 4,851,303 A | 7/1989 | Madou et al. | 429/13 |
| 4,863,813 A | 9/1989 | Dyer | 429/33 |
| 4,876,115 A | 10/1989 | Raistrick | 427/115 |
| 4,883,497 A | 11/1989 | Claar et al. | 29/623 |
| 4,894,355 A | 1/1990 | Takeuchi et al. | 502/101 |
| 4,927,793 A | 5/1990 | Hori et al. | 501/134 |
| 4,943,494 A | 7/1990 | Riley | 429/30 |
| 4,948,680 A | 8/1990 | Madou et al. | 429/13 |
| 4,973,530 A | 11/1990 | Vanderborgh et al. | 429/13 |
| 4,973,531 A | 11/1990 | Zajma et al. | 429/37 |
| 4,985,315 A | 1/1991 | Lemoine | 429/33 |
| 4,988,582 A | 1/1991 | Dyer | 429/30 |
| 4,994,331 A | 2/1991 | Cohen | 429/17 |
| 5,035,961 A | 7/1991 | Riley | 429/33 |
| 5,035,962 A | 7/1991 | Jensen | 429/40 |
| 5,037,525 A | 8/1991 | Badwal | 204/421 |
| 5,045,414 A | 9/1991 | Bushnell et al. | 429/17 |
| 5,047,298 A | 9/1991 | Perry, Jr. et al. | 429/17 |
| 5,049,459 A | 9/1991 | Akagi | 429/33 |
| 5,059,497 A | 10/1991 | Prince et al. | 429/193 |
| 5,069,985 A | 12/1991 | Cohen et al. | 429/26 |
| 5,069,987 A | 12/1991 | Gordon | 429/31 |
| 5,084,144 A | 1/1992 | Reddy et al. | 205/104 |
| 5,106,706 A | 4/1992 | Singh et al. | 429/31 |
| 5,114,803 A | 5/1992 | Ishihara et al. | 429/30 |
| 5,122,425 A | 6/1992 | Yoshida et al. | 429/33 |
| 5,130,210 A | 7/1992 | Iwasaki et al. | 429/33 |
| 5,132,193 A | 7/1992 | Reddy et al. | 429/13 |
| 5,143,801 A | 9/1992 | Bates | 429/33 |
| 5,149,601 A | 9/1992 | Shiratori et al. | 429/30 |
| 5,154,986 A | 10/1992 | Takechi et al. | 429/23 |
| 5,154,987 A | 10/1992 | Hash et al. | 429/33 |
| 5,162,167 A | 11/1992 | Minh et al. | 429/30 |
| 5,164,060 A | 11/1992 | Fisman et al. | 204/282 |
| 5,169,731 A | 12/1992 | Yoshimura et al. | 29/30 |
| 5,176,967 A | 1/1993 | Ishihara et al. | 429/31 |
| 5,186,806 A | 2/1993 | Clark | 204/265 |
| 5,187,025 A | 2/1993 | Kelland et al. | 429/33 |
| 5,188,910 A | 2/1993 | Ishihara et al. | 429/31 |
| 5,190,834 A | 3/1993 | Kendall | 429/31 |
| 5,192,627 A | 3/1993 | Perry, Jr. et al. | 429/17 |
| 5,200,278 A | 4/1993 | Watkins et al. | 429/24 |
| 5,200,279 A | 4/1993 | Draper et al. | 429/30 |
| 5,213,911 A | 5/1993 | Bloom et al. | 429/33 |
| 5,217,822 A | 6/1993 | Yoshida et al. | 429/33 |
| 5,219,673 A | 6/1993 | Kaun | 429/32 |
| 5,223,353 A | 6/1993 | Oshawa et al. | 429/192 |
| 5,232,794 A | 8/1993 | Krumpelt et al. | 429/30 |
| 5,234,722 A | 8/1993 | Ito et al. | 427/453 |
| 5,234,777 A | 8/1993 | Wilson | 429/33 |
| 5,242,764 A | 9/1993 | Dhar | 429/30 |
| 5,244,753 A | 9/1993 | Taniguchi et al. | 429/33 |
| 5,246,792 A | 9/1993 | Watanabe | 429/33 |
| 5,248,566 A | 9/1993 | Kumar et al. | 429/33 |
| 5,252,410 A | 10/1993 | Wilkinson et al. | 429/33 |
| 5,256,499 A | 10/1993 | Minh et al. | 429/33 |
| 5,262,249 A | 11/1993 | Beal et al. | 429/26 |
| 5,264,299 A | 11/1993 | Krasij et al. | 429/30 |
| 5,266,419 A | 11/1993 | Yamada | 429/30 |
| 5,266,421 A | 11/1993 | Townsend et al. | 429/192 |
| 5,270,131 A | 12/1993 | Diethelm et al. | 429/34 |
| 5,272,017 A | 12/1993 | Swathirajan et al. | 429/33 |
| 5,273,838 A | 12/1993 | Draper et al. | 429/31 |
| 5,279,906 A | 1/1994 | Yoshimura et al. | 429/30 |
| 5,281,490 A | 1/1994 | Nishioka et al. | 429/33 |
| 5,286,579 A | 2/1994 | Akagi | 429/33 |
| 5,290,323 A | 3/1994 | Okuyama | 29/623 |
| 5,290,642 A | 3/1994 | Minh et al. | 429/33 |
| 5,292,599 A | 3/1994 | Soma et al. | 429/30 |
| 5,292,600 A | 3/1994 | Kaufman | 429/39 |
| 5,298,235 A | 3/1994 | Worrell et al. | 429/33 |
| 5,302,269 A | 4/1994 | Eisman et al. | 204/252 |
| 5,304,430 A | 4/1994 | Ludwig | 429/17 |
| 5,306,574 A | 4/1994 | Singh et al. | 429/13 |
| 5,308,712 A | 5/1994 | Seike et al. | 429/30 |
| 5,312,700 A | 5/1994 | Ishida | 429/30 |
| 5,316,869 A | 5/1994 | Perry, Jr. et al. | 429/19 |
| 5,316,871 A | 5/1994 | Swathirajan et al. | 429/33 |
| 5,330,859 A | 7/1994 | McPheeters et al. | 429/33 |
| 5,330,860 A | 7/1994 | Grot et al. | 429/42 |
| 5,336,570 A | 8/1994 | Dodge | 429/31 |
| 5,338,622 A | 8/1994 | Hsu et al. | 429/26 |
| 5,342,704 A | 8/1994 | Vasilow et al. | 429/31 |
| 5,342,705 A | 8/1994 | Minh et al. | 429/32 |
| 5,344,721 A | 9/1994 | Sonai et al. | 429/20 |
| 5,346,780 A | 9/1994 | Suzuki | 429/42 |
| 5,350,641 A | 9/1994 | Mogensen et al. | 429/30 |
| 5,350,643 A | 9/1994 | Imahashi et al. | 429/33 |
| 5,354,626 A | 10/1994 | Kobayashi et al. | 429/30 |
| 5,356,728 A | 10/1994 | Balachandran et al. | 429/8 |
| 5,356,730 A | 10/1994 | Minh et al. | 429/32 |
| 5,358,620 A | 10/1994 | Golovin et al. | 204/421 |
| 5,358,735 A | 10/1994 | Kawaskai et al. | 427/115 |
| 5,358,799 A | 10/1994 | Gardner | 429/26 |
| 5,364,711 A | 11/1994 | Yamada et al. | 429/15 |
| 5,366,818 A | 11/1994 | Wilkinson et al. | 429/13 |
| 5,368,951 A | 11/1994 | Shiratori et al. | 429/30 |
| 5,372,895 A | 12/1994 | Sato et al. | 429/30 |
| 5,372,896 A | 12/1994 | Binder et al. | 429/33 |
| 5,382,478 A | 1/1995 | Chow et al. | 429/26 |

| | | | |
|---|---|---|---|
| 5,385,792 A | 1/1995 | Shiratori et al. | 429/32 |
| 5,395,704 A | 3/1995 | Barnett et al. | 429/30 |
| 5,395,705 A | 3/1995 | Door et al. | 429/42 |
| 5,403,461 A | 4/1995 | Tuller et al. | 204/252 |
| 5,403,675 A | 4/1995 | Ogata et al. | 429/33 |
| 5,407,758 A | 4/1995 | Greiner et al. | 429/33 |
| 5,419,980 A | 5/1995 | Okamoto et al. | 429/32 |
| 5,449,697 A | 9/1995 | Noaki et al. | 521/27 |
| 5,470,671 A | 11/1995 | Fletcher et al. | 429/26 |
| 5,500,292 A | 3/1996 | Muranaka et al. | 429/209 |
| 5,521,020 A | 5/1996 | Dhar | 429/142 |
| 5,523,175 A | 6/1996 | Beal et al. | 429/30 |
| 5,523,177 A | 6/1996 | Kosek et al. | 429/40 |
| 5,525,436 A | 6/1996 | Savinell et al. | 429/30 |
| 5,532,072 A | 7/1996 | Spaeh et al. | 429/34 |
| 5,534,362 A * | 7/1996 | Okamoto et al. | 429/32 |
| 5,547,777 A | 8/1996 | Richards | 429/32 |
| 5,561,202 A | 10/1996 | Helmer-Metzmann et al. | 525/471 |
| 5,599,638 A | 2/1997 | Surampudi et al. | 429/33 |
| 5,599,639 A | 2/1997 | Sansome et al. | 429/33 |
| 5,607,785 A | 3/1997 | Tozawa et al. | 429/33 |
| 5,624,769 A | 4/1997 | Li et al. | 429/32 |
| 5,639,516 A | 6/1997 | Dirven | 427/421 |
| 5,654,109 A | 8/1997 | Plowman | 429/13 |
| 5,677,074 A | 10/1997 | Serpico et al. | 429/43 |
| 5,686,197 A | 11/1997 | Nishida et al. | 429/30 |
| 5,707,755 A | 1/1998 | Grot | 429/40 |
| 5,726,105 A | 3/1998 | Grasso et al. | 442/326 |
| 5,750,281 A | 5/1998 | Washington et al. | 429/39 |
| 5,759,712 A | 6/1998 | Hockaday | 429/30 |
| 5,763,113 A | 6/1998 | Meltser et al. | 429/13 |
| 5,773,160 A | 6/1998 | Wilkinson et al. | 429/13 |
| 5,776,625 A | 7/1998 | Kaufman et al. | 429/30 |
| 5,783,324 A | 7/1998 | Binder et al. | 429/31 |
| 5,783,325 A | 7/1998 | Cabasso et al. | 429/42 |
| 5,789,091 A | 8/1998 | Wozniczka et al. | 429/12 |
| 5,798,186 A | 8/1998 | Fletcher et al. | 429/13 |
| 5,804,326 A | 9/1998 | Chow et al. | 429/26 |
| 5,858,567 A | 1/1999 | Spear, Jr. et al. | 429/12 |
| 5,863,671 A | 1/1999 | Spear, Jr, et al. | 429/12 |
| 5,863,672 A | 1/1999 | Ledjeff et al. | 429/26 |
| 5,863,673 A | 1/1999 | Campbell et al. | 429/44 |
| 5,869,202 A | 2/1999 | Marchetti | 429/30 |
| 5,874,182 A | 2/1999 | Wilkinson et al. | 429/30 |
| 5,925,322 A | 7/1999 | Werth | 422/170 |
| 5,931,658 A | 8/1999 | Sederquist et al. | 431/207 |
| 5,935,726 A | 8/1999 | Chow et al. | 429/13 |
| 5,945,232 A * | 8/1999 | Ernst et al. | 429/32 |
| 5,989,741 A | 11/1999 | Bloomfield et al. | 429/32 |
| 5,993,987 A | 11/1999 | Wozniczka et al. | 429/37 |
| 6,007,931 A | 12/1999 | Fuller et al. | 429/13 |
| 6,007,932 A | 12/1999 | Steyn | 429/31 |
| 6,007,933 A | 12/1999 | Jones | 429/38 |
| 6,010,798 A | 1/2000 | Hammerschmidt et al. | 429/30 |
| 6,015,634 A | 1/2000 | Bonville, Jr. et al. | 429/17 |
| 6,024,848 A | 2/2000 | Dufner et al. | 204/252 |
| 6,025,084 A | 2/2000 | Kawasaki et al. | 429/30 |
| 6,030,718 A | 2/2000 | Fuglevand et al. | 429/26 |
| 6,045,934 A | 4/2000 | Enami et al. | 429/30 |
| 6,051,192 A | 4/2000 | Maston et al. | 422/110 |
| 6,051,329 A | 4/2000 | Fasano et al. | 429/30 |
| 6,051,330 A | 4/2000 | Fasano et al. | 429/30 |
| 6,080,501 A | 6/2000 | Kelley et al. | 429/31 |
| 6,127,058 A * | 10/2000 | Pratt et al. | 429/30 |
| 6,210,823 B1 | 4/2001 | Hatoh et al. | 429/30 |

OTHER PUBLICATIONS

Lam–Leung et al; Journal of Applied Polymer Science, vol. 57, 1995, pp. 1373–1379 (Month Unknown).

Dowling et al; Macromolecules 1991, pp. 4131–4237 (Month Unknown).

Thedoropoulouse et al; Journal of Applied Polymer Science, vol. 46, 1992, pp. 1461–1465 (Month Unknown).

Chainey et al; Journal of Polymer Science, 1989, vol. 27, pp. 3187–3199 (Month Unknown).

Tovbin et al; Russian Journal of Physical Chemistry, vol. 67, 1993, pp. 471–474 (Month Unknown).

Kreuer et al; Chemical Material 1996, vol. 8, pp. 610–641 (Month Unknown).

Wieczorek et al; Electrochimica Acta, vol. 40 (1995) pp. 2327–2330 (Month Unknown).

Poinsignon et al; Materials Science and Engineering (1989), pp. 31–37 (Month Unknown).

Solomin; Polymer Science USSR vol. 34, 1992, pp. 274–275 (Month Unknown).

Zawodzinski et al; Solid State Ionics, vol. 60 (1993), pp. 199–211 (Month Unknown).

Ticianelli et al; Journal of Applied Electro–Chemistry, vol. 21 (1991), pp. 597–605 (Month Unknown).

Savodogo et al; Journal of the Electro Chemical Society, vol. 141, No. 8, 1994, pp. L92–L95 (Aug.).

Staiti et al; Journal of Applied Electrochemistry; vol. 22 (1992), pp. 663–667. (Month Unknown).

Gao et al; Electrochimica Acta; vol. 37, No. 8, pp. 1327–1332 (1992) (Month Unknown).

Mosdale et al; Solid State Ionics; vol. 61 (1993), pp. 251–255 (Month Unknown).

Uchida et al; Journal of the Electrochemical Society; No. 142 (1995), pp. 463–168 (Feb.).

Shukla et al; Journal of Applied Electrochemistry; vol. 19 (1989), pp. 383–386 (Month Unknown).

Hamnett et al; Journal of Applied Electrochemistry, vol. 21, (1991), pp. 982–985 (Month Unknown).

Ticianelli et al; Journal of Electro Chemical Society; vol. 135, (1988), pp. 2209–2214 (Month Unknown).

Prater et al; Journal of Power Sources; vol. 37 (1992), pp. 181–188 (Month Unknown).

Prater et al; Journal of Power Sources; vol. 29, (1990), pp. 239–250 (Month Unknown).

Svinivasen et al; Journal of Power Sources; vol. 22 (1988), pp. 359–375 (Month Unknown).

Ticianelli et al; Journal of Electroanalytical Chemistry; vol. 251 (1988) , pp. 275–295 (Month Unknown).

Moore et al; Macromolecules; vol. 22 (1984), 3594–3599.

U.S. Dept. of Energy; Fuel Cells A Handbook (Revision 3); Jan. 1994, pp. 1–1 –9–14.

Fuel Cell Systems; American Chemical Society Symposia, Apr. 6–7, 1964, pp. 18–201 (Month N/A).

Fuel Cell Systems II; American Chemical Society Symposia, Sep. 12–14, 1967, pp. 1–80 (Month N/A).

* cited by examiner

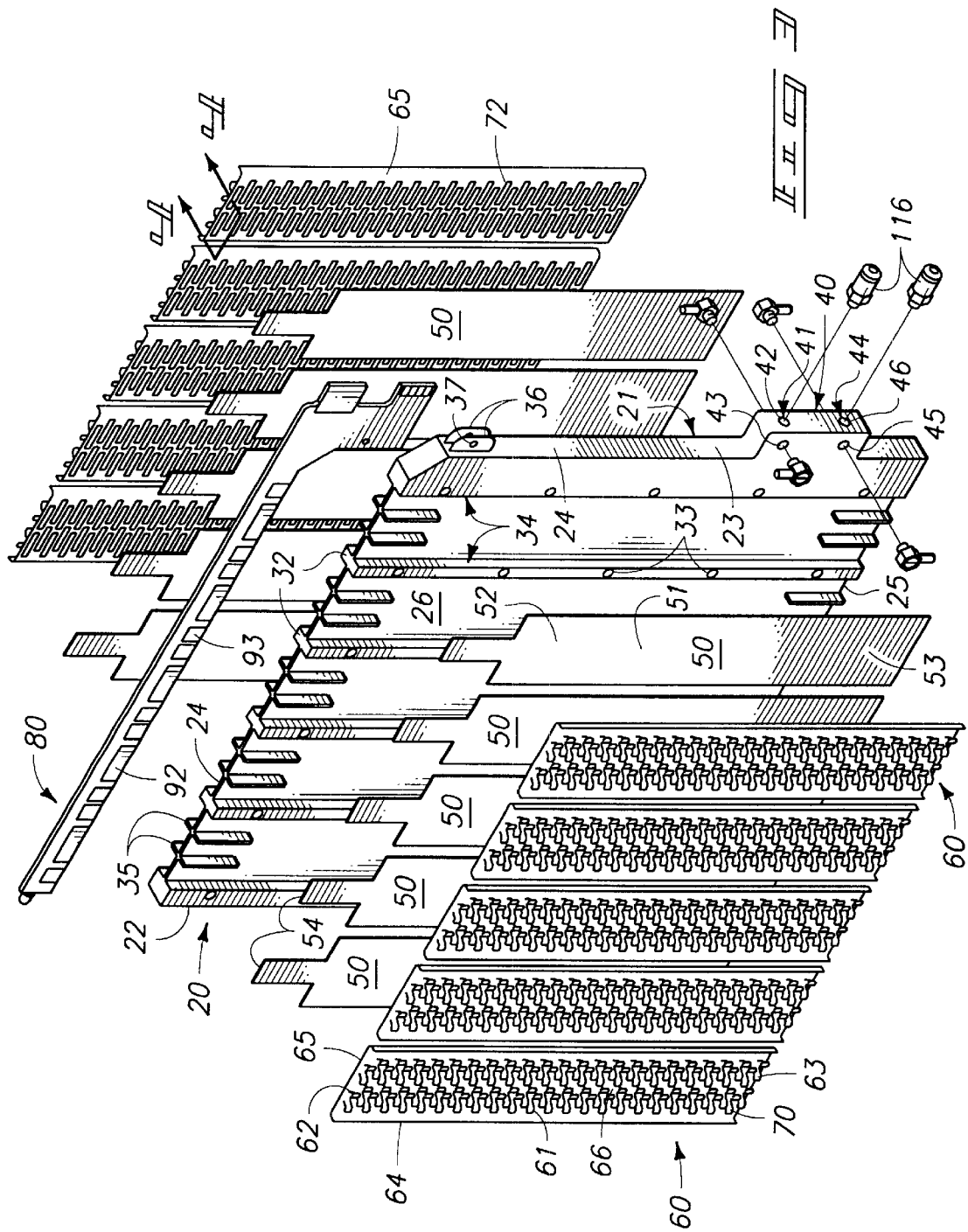

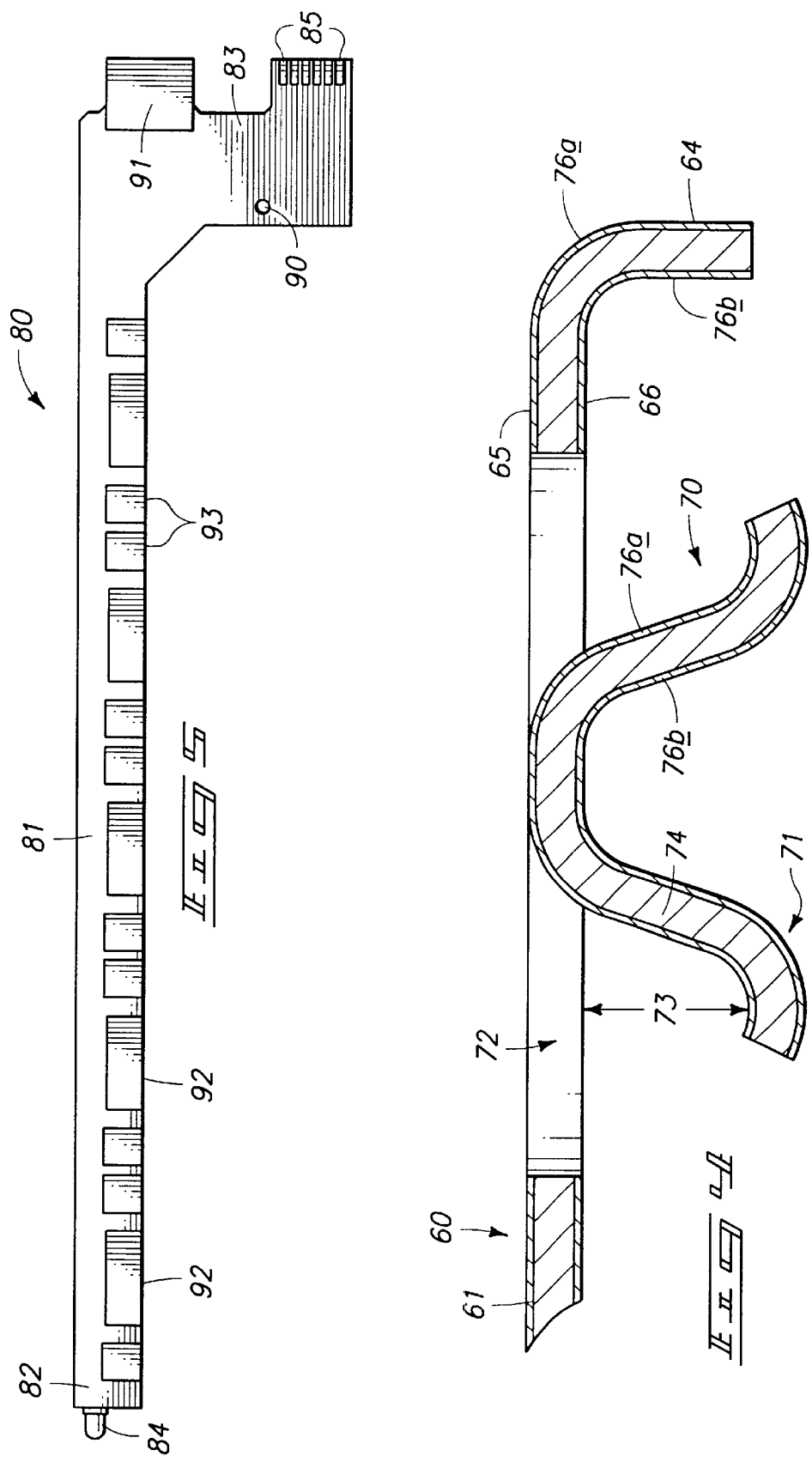

ION EXCHANGE MEMBRANE FUEL CELL

BACKGROUND OF THE INVENTION

1. Field of the Invention

The present invention relates to an ion exchange membrane fuel cell, and more specifically, to an ion exchange membrane fuel cell module which is incorporated into a fuel cell power system.

2. Description of the Prior Art

The operation of fuel cells are well known. A fuel cell generates electricity from a fuel source, such as hydrogen gas, and an oxidant such as oxygen or air. The chemical reaction does not result in a burning of the fuel to produce heat energy, therefore, the thermodynamic limits on the efficiency of such a reaction are much greater than conventional power generation processes. In a proton exchange membrane fuel cell, the fuel gas (hydrogen) is ionized on one electrode and the hydrogen ions diffuse across the membrane to recombine with oxygen ions on the cathode. The byproduct of the reaction is water and the production of an electrical current.

In our application Ser. No. 08/979,853, now U.S. Pat. No. 6,030,718, the inventors disclosed a new and novel proton exchange membrane fuel cell power system which includes a plurality of discrete fuel cell modules which are self-humidifying and which offer a degree of reliability, ease of maintenance and other advantages not known heretofore with respect to fuel cell designs which have been primarily directed to stack-type arrangements. The teachings of this earlier patent are incorporated by reference herein.

While the modular fuel cell disclosed in the earlier patent referenced above operates with a great deal of success, the inventors have endeavored to improve upon this inventive concept by focusing further investigation on increasing the performance, versatility, and the range of the operational parameters of fuel cells of this general design.

Accordingly, an ion exchange membrane fuel cell which achieves the benefits to be derived from the aforementioned technology, but which avoids the detriments individually associated with stack type fuel cell designs is the subject matter of the present invention.

SUMMARY OF THE INVENTION

One aspect of the present invention is to provide an ion exchange membrane fuel cell having multiple modules each enclosing a membrane electrode diffusion assembly, and wherein at least one of the modules can be easily removed from the ion exchange membrane fuel cell, by hand, while the remaining modules continue to operate.

Another aspect of the present invention is to provide an ion exchange membrane fuel cell having a module enclosing a membrane electrode diffusion assembly which has an active area defined by a surface area, and which produces an average current density of at least about 350 mA per square centimeter of surface area when supplied with a dilute fuel at a nominal voltage of about 0.5 volts.

Another aspect of the present invention is to provide an ion exchange membrane fuel cell power system having a plurality of discrete ion exchange membrane fuel cell modules which can be manipulated by hand, and which further produce a given amount of heat energy, and wherein each of the discrete ion exchange membrane fuel cell modules have an anode heat sink which removes a preponderance of the heat energy generated by the respective ion exchange membrane fuel cell modules.

Yet further, another aspect of the present invention is to provide an ion exchange membrane fuel cell power system which has an ion exchange membrane fuel cell module which produces heat energy and which has a bifurcated air flow which regulates the operational temperature of the ion exchange membrane fuel cell module by removing the heat energy therefrom.

Yet another aspect of the present invention relates to an ion exchange membrane fuel cell module having a pair of membrane electrode diffusion assemblies disposed in spaced relation, one to the other, and wherein each membrane electrode diffusion assembly has an anode side, and an opposite cathode side, and wherein the cathode side of each of the membrane electrode diffusion assemblies are proximally related, and the anode sides are distally related, and wherein each cathode side defines, in part, a bifurcated cathode air passageway.

Another aspect of the present invention relates to an ion exchange membrane fuel cell module having a pair of membrane electrode diffusion assemblies each having opposite anode and cathode sides, and wherein anode and cathode current collectors are electrically coupled with the opposite anode and cathode sides; a support member disposed between the pair of membrane electrode diffusion assemblies, and wherein the cathode side of each membrane electrode diffusion assembly faces in the direction of the support member; a cathode air passageway defined between the support member and the cathode side of each of the membrane electrode diffusion assemblies; a fuel distribution assembly coupled in fluid flowing relation relative to the anode side of each membrane diffusion assembly; and an anode heat sink oriented in heat receiving relation relative to the anode side of each membrane electrode diffusion assembly to facilitate the removal of a preponderance of the heat energy generated by each membrane electrode diffusion assembly.

These and other aspects of the present invention will be discussed in further detail hereinafter.

DETAILED DESCRIPTION OF THE DRAWINGS

Preferred embodiments of the invention are described below with reference to the following accompanying drawings.

FIG. 3 is a perspective, partial, exploded, side elevation view of an ion exchange membrane fuel cell module of the present invention.

FIG. 4 is a partial, transverse, vertical sectional view of a cathode current collector, and which is taken from a position along line 4—4 of FIG. 3.

FIG. 5 is a fragmentary, side elevation view of a current conductor assembly employed with the ion exchange membrane fuel cell module of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
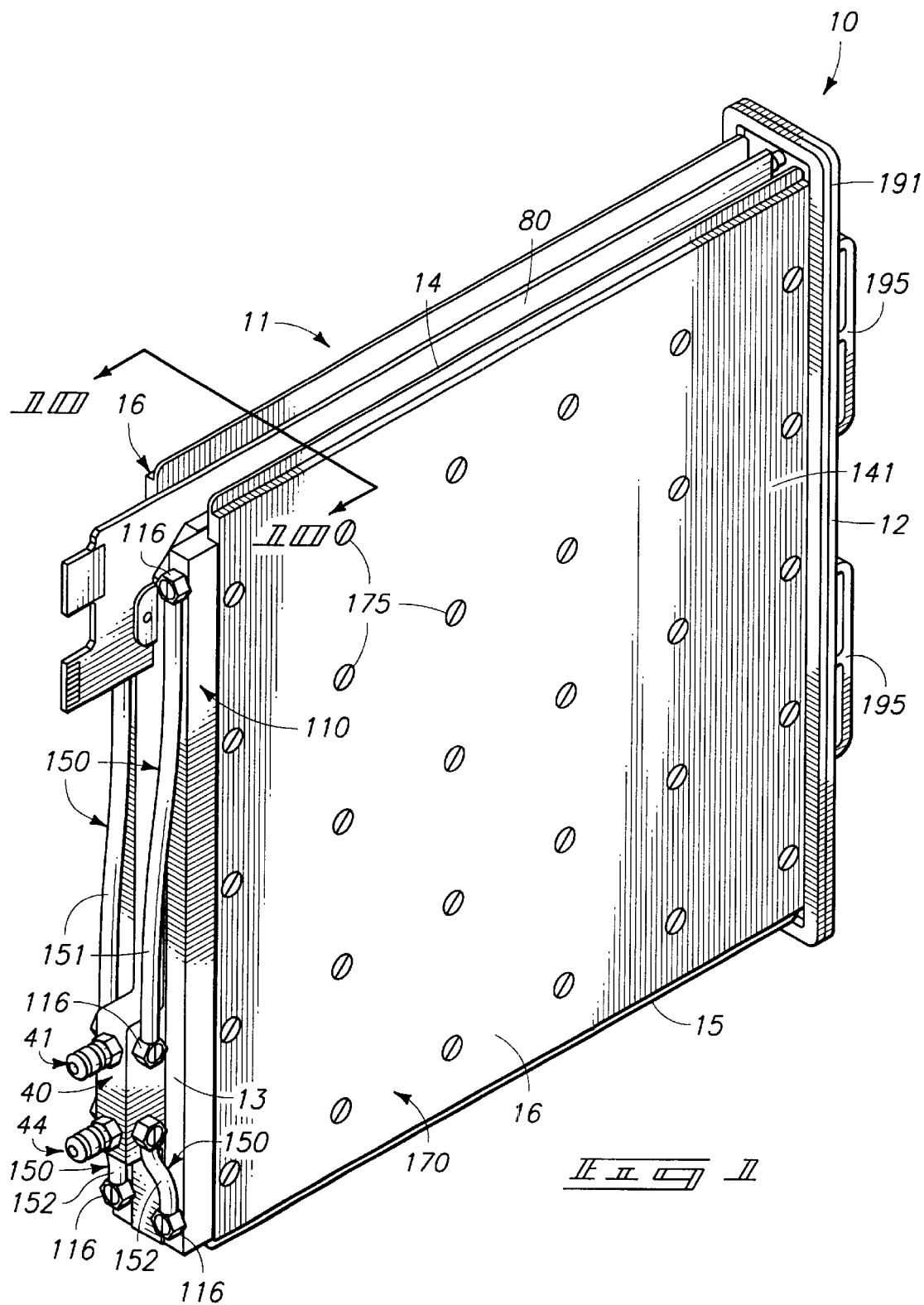
FIG. 1 is a perspective, side elevation view of an ion exchange membrane fuel cell module of the present invention.

The ion exchange membrane fuel cell of the present invention is generally indicated by the numeral 10 in FIG. 1. As shown therein, the ion exchange membrane fuel cell comprises a hand manipulatable module 11 which has a forward edge 12, an opposite, rearward edge 13, top and bottom surfaces or edges 14 and 15, and opposite sidewalls generally indicated by the numeral 16. Each facet of the module 11 will be discussed in greater detail hereinafter.

Figure 2:
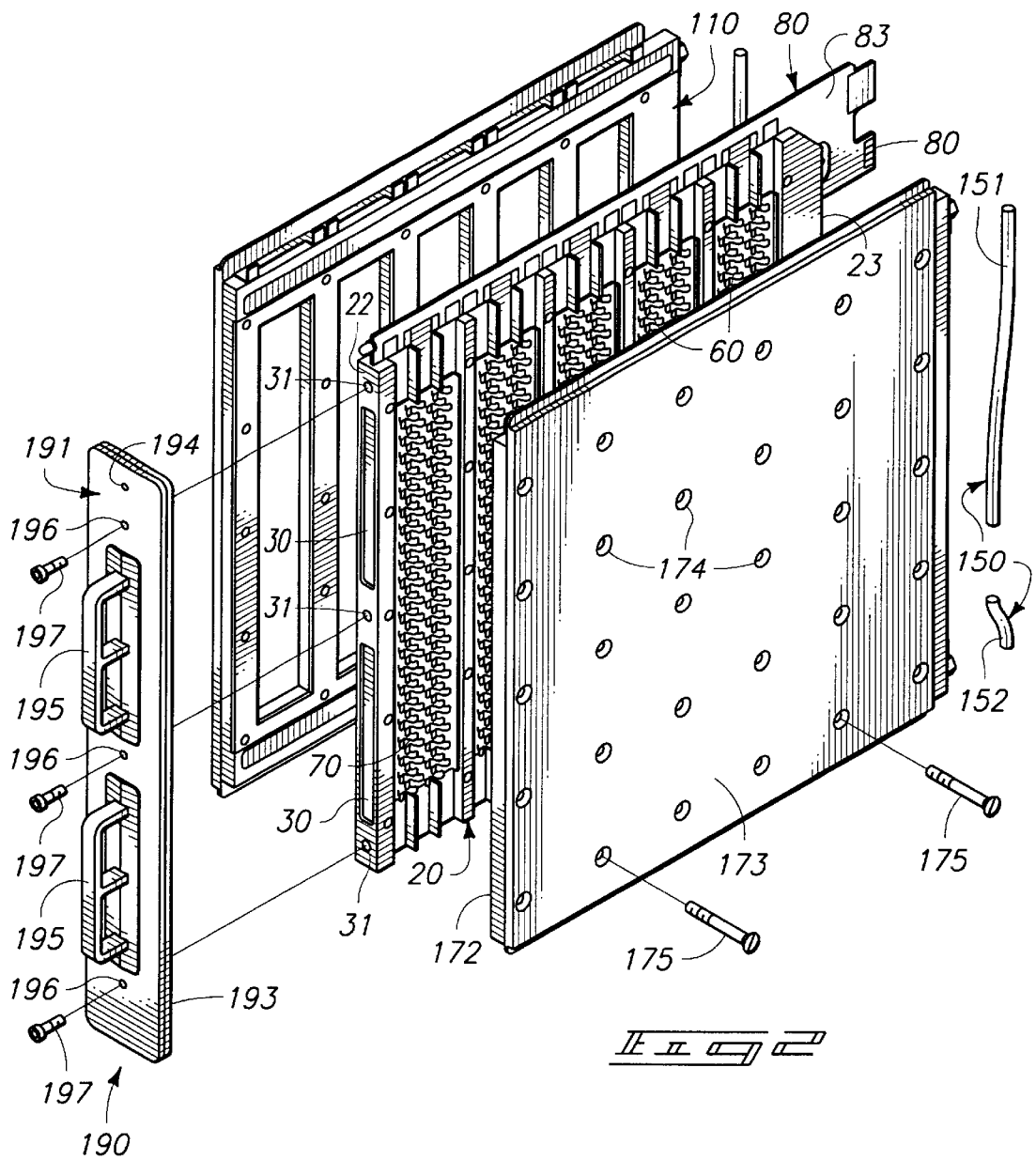
FIG. 2 is a perspective, exploded, side elevation view of an ion exchange membrane fuel cell module of the present invention.

As best seen in FIGS. 2 and 3, the module 11 includes a nonconductive, dielectric support member generally indicated by the numeral 20. The support member can be fashioned out of various synthetic polymeric substrates. The support member has a main body 21, which is defined by a forward peripheral edge 22; a rearward peripheral edge 23; a top peripheral edge 24; an opposite, bottom peripheral edge 25; and opposite sidewalls generally indicated by the numeral 26. As best seen in FIG. 2, a pair of recessed channels 30 are formed in the forward peripheral edge 22. Further, a plurality of fastener receiving passageways 31 are also formed in the forward peripheral edge. Yet further, and as seen in FIG. 3, a plurality of spaced ribs 32 are borne by, or made integral with the respective sidewalls 26 and are disposed in spaced relation, one to the other. Fastener passageways or apertures 33 are formed through each of the ribs. Further, cavities 34 are defined between the respective ribs 32 on each sidewall. The cavities 34 formed on each of the sidewalls are disposed in substantially opposed relation one to the other. This is seen in FIG. 3. Further, as best seen in FIG. 3, a pair of orientation members 35 are disposed between each of the ribs 32 and define a space therebetween. A pair of mounting tabs 36 are mounted in spaced relationship, one to the other, on the rearward peripheral edge 23 of the main body 21. A pair of substantially coaxially aligned apertures 37 are individually formed in each of the mounting tabs 36 and are operable to receive a fastener therethrough. This aspect of the invention will be discussed in further detail hereinafter.

A fuel coupling 40 is made integral with or forms a portion of the rearward peripheral edge 23 of the support member 20. The fuel coupling 40 includes a fuel delivery passageway 41 which is substantially T shaped and which is defined by an intake end 42 and a pair of exhaust ends labeled 43. Additionally, the fuel coupling also includes an exhaust passageway 44 which is also substantially T shaped and which is defined by a pair of intake ends 45, and an exhaust end 46. The operation of the fuel coupling 40 will be discussed in greater detail hereinafter.

As best seen in FIGS. 2 and 3, individual conductor plates generally designated by the numeral 50 are matingly received within the individual cavities 34 which are defined by the support member 20. The conductor plates which are fabricated from an electrically conductive substrate, have a substantially planar main body 51, which has a first end 52, and an opposite, second end 53. The main body 51 further has a conductive tab 54 which extends outwardly relative to the first end 52, and which is oriented between the individual orientation members 35. The conductive tab extends substantially normally outwardly relative to the top peripheral edge 24 of the support member 20. As will be recognized, the main body 51 matingly rests between the individual ribs 32 which define, in part, the respective cavities 34.

As best seen in the exploded view of FIG. 3, a cathode current collector is generally designated by the numeral 60, and rests in ohmic electrical contact with the main body 51 of the individual conductor plates 50. The cathode current collector, which is fabricated from an electrically conductive substrate, has a main body 61 which has opposite first and second ends 62 and 63, respectively. The cathode current collector simultaneously performs the functions of current collection, force application and heat dissipation. These functional aspects of the current collector will be discussed in greater detail hereinafter. Still further, the main body 61 of the current collector 60 is defined by a peripheral edge 64. As seen in the cross sectional view of FIG. 4, the main body 61 of the cathode current collector 60 defines a channel shaped member. The main body also has a first surface 65 which rests in ohmic electrical contact against the main body 51 of the underlying conductor plate 50, and an opposite second surface 66. Still further, a plurality of elastically deformable electrically conductive members 70 are formed in the main body 61 and extend downwardly from the second surface. It should be understood that each of the deformable electrically conductive members 70 have a cathode engagement surface 71, which rests in ohmic electrical contact against an adjacent cathode which will be discussed in greater detail hereinafter. However, it will be appreciated from this discussion that the conductive members 70 and the cathode engagement surfaces 71 operate to provide both current collection and a force application element. Still further, the fabrication of the deformable members 70 defines individual apertures 72 in the main body 61. Yet further, a space 73 is defined between the elastically deformable electrically conductive members 70, and the second surface 66, of the main body 61. This physical arrangement of the cathode current collector 60 will be discussed in greater detail hereinafter.

As best seen by reference to FIG. 4, which shows a greatly exaggerated view of one of the deformable electrically conductive members 70, it will be seen that the cathode current collector 60 comprises an electrically and thermally conductive metallic composite substrate having a plurality of layers. In this regard, the cathode current collector has a first layer fabricated from a suitable electrically conductive substrate such as stainless steel 74. This layer 74 has a thickness dimension of about $20/1000$ to about $40/1000$ inches. Yet further, and resting on the exposed surface of the stainless steel layer 74, are individual first and second layers of nickel 76A and 76B respectively. The respective layers of nickel have an average thickness of about $0.1/1000$ to about $1.0/1000$ inches.

As should be understood, while a conductor plate 50 and cathode current collector 60 are shown in combination, it is possible to fabricate a cathode current collector 60 having a conductive tab similar to the conductive tab 54 which is made integral with the conductor plate 50. This would eliminate the necessity for the individual conductor plates 50.

As best seen in FIGS. 3 and 5, a current conductor assembly or circuit board is generally designated by the numeral 80. This current conductor assembly, in operation, rests on, and is releasably secured to, the top peripheral edge 24 of the support member 20, and further matingly fits between the mounting tabs 36 which are mounted on the rearward peripheral edge 23 of the support member 20 (FIG. 1). The current conductor assembly or circuit board 80 has a main body 81 which is fabricated from a substrate upon which it is possible to conduct soldering operations. Formed on the main body 81 are a number of conductive tracings (not shown) which are thereafter covered by a dielectric substance. The main body 81 also has a first end 82, and an opposite second end 83. Further, an engagement member 84 is mounted on the first end 82 and is operable to matingly couple with the handle assembly which will be discussed in greater detail hereinafter. Yet further, a plurality of electrical contacts 85 are mounted on, or made integral with the second end 83, and are electrically coupled with the numerous electrical tracings (not shown) which are laid out along the main body 81 of the current conductor assembly 80. As seen in FIG. 5, an aperture 90 is formed in the main body 81, and is operable to be coaxially aligned with the apertures 37, which are individually formed in the pair of mounting tabs 36. When coaxially aligned, the respective apertures receive a fastener which releasably secures the current conductor assembly on the top peripheral edge 24 of the support member 20. An alignment or engagement member 91 is fastened or borne on the second end 82, and is operable to releasably engage a subrack which will be discussed, below. Further, a plurality of conductive areas 92 and 93 are formed along the main body. The conductive areas 92 are disposed in ohmic electrical contact with the conductor plates 50 when the ion exchange membrane fuel cell module is assembled. Further, anode current collectors are disposed in ohmic electrical contact with the conductive areas 93. The anode current collectors will also be discussed in greater detail hereinafter. It should be understood that the current conductor assembly 80 couples each of the individual cavities 34 in serial electrical contact one with the other.

Figure 6:
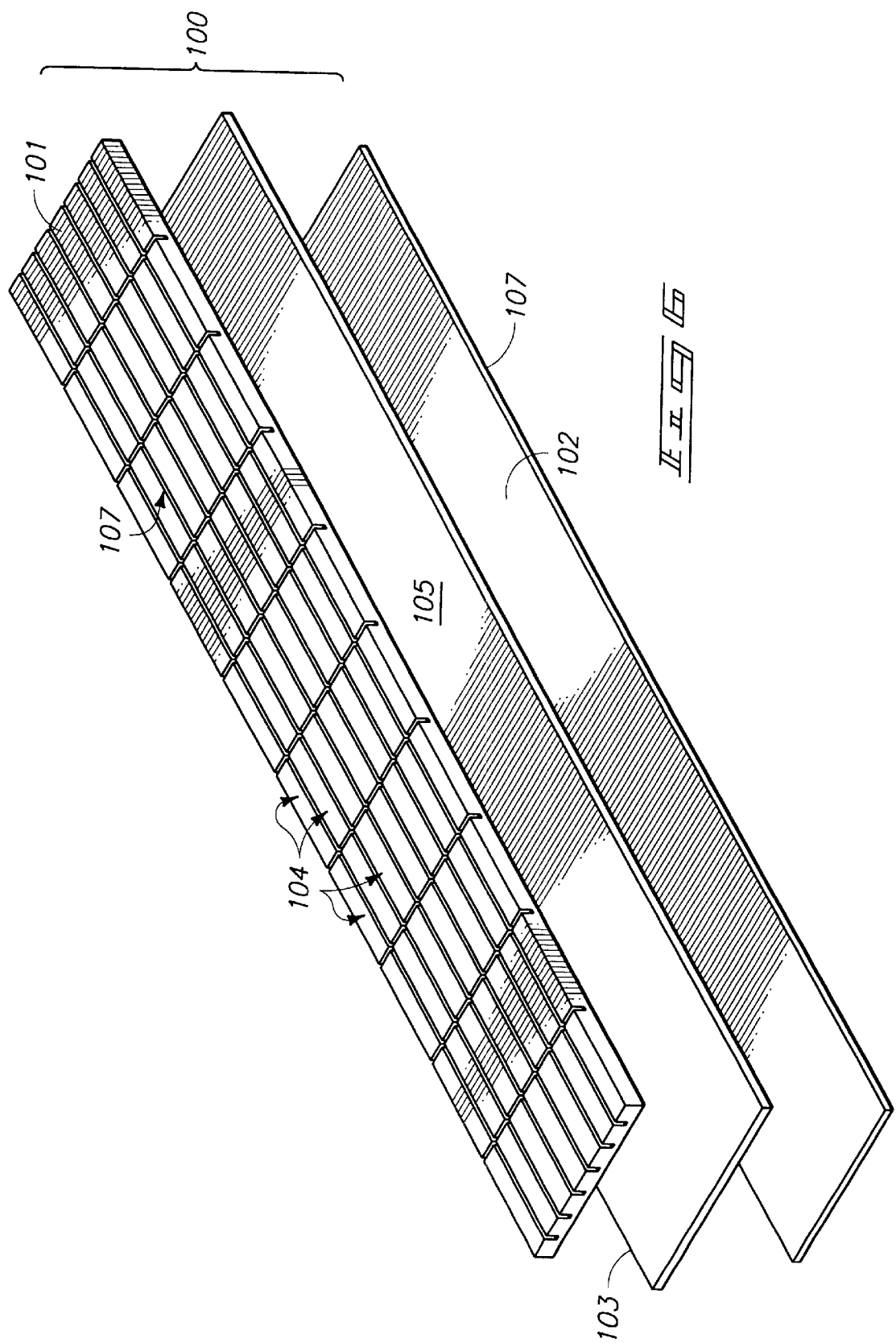
FIG. 6 is a fragmentary, perspective, greatly enlarged, exploded view of a membrane electrode diffusion assembly employed with the ion exchange membrane fuel cell module of the present invention.
Figure 9:
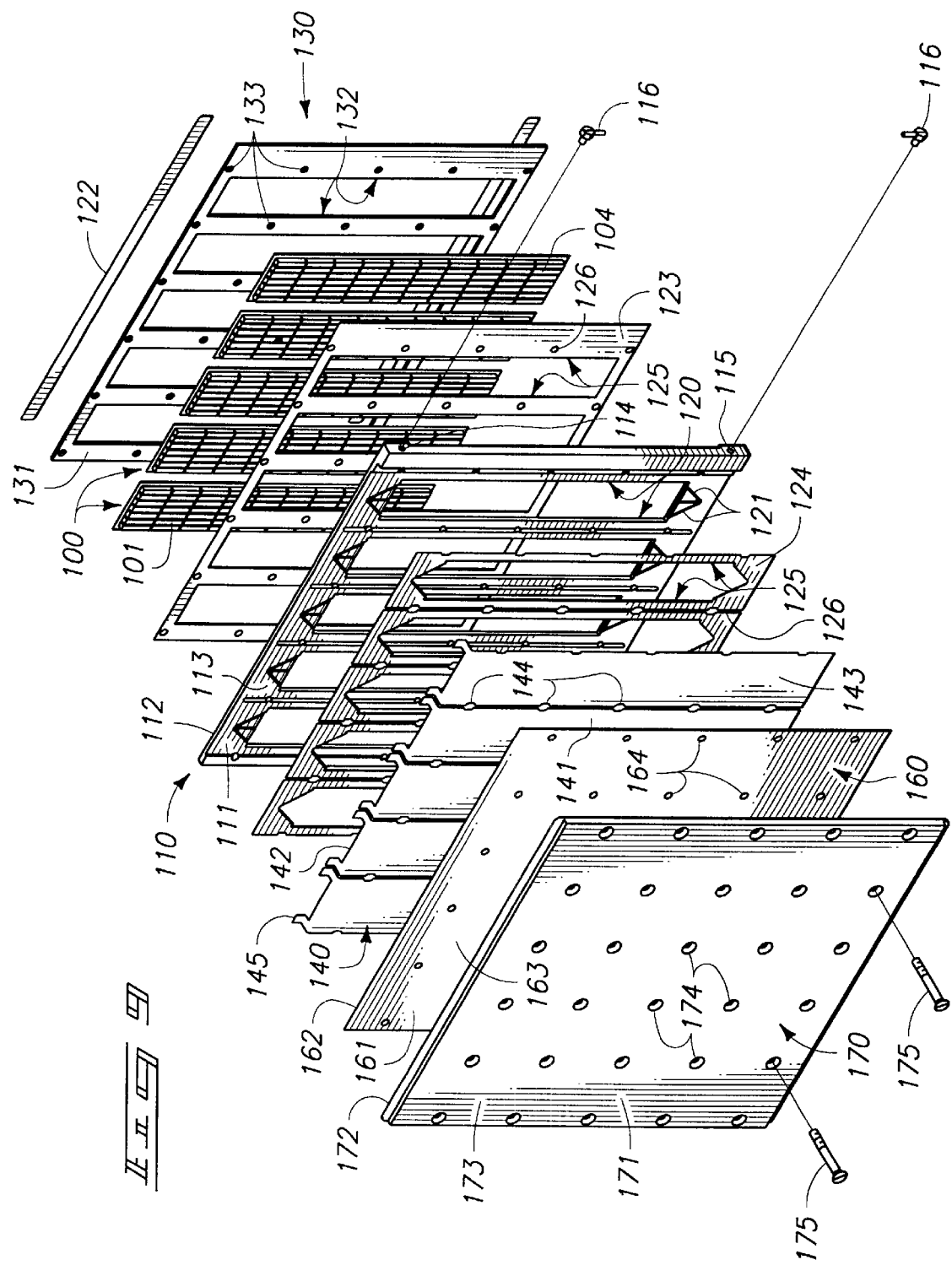
FIG. 9 is a second, perspective, partial, exploded view of a portion of the ion exchange membrane fuel cell module of the present invention.
Figure 10:
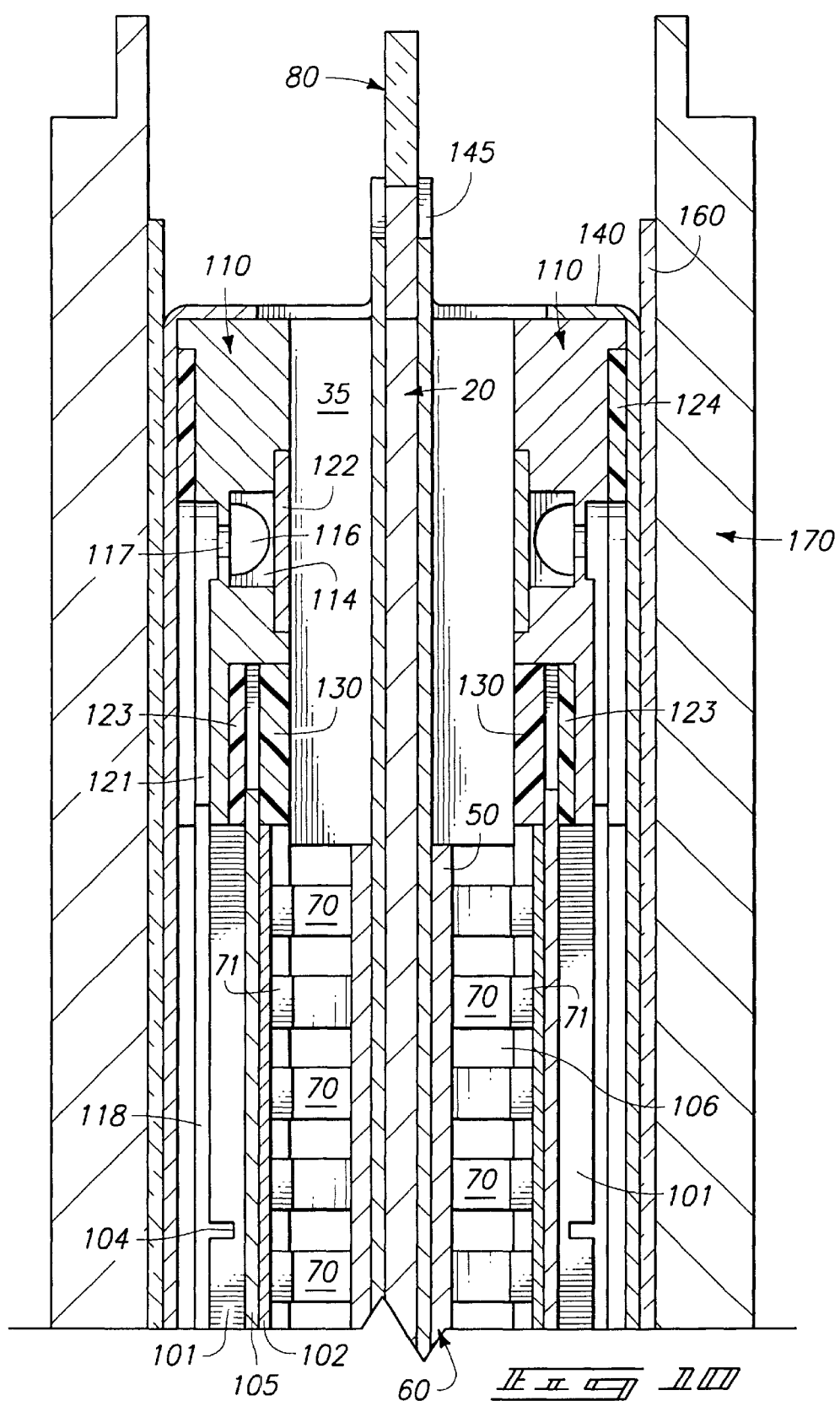
FIG. 10 is a transverse vertical sectional view taken from a position along line 10—10 of FIG. 1.
Figure 13:
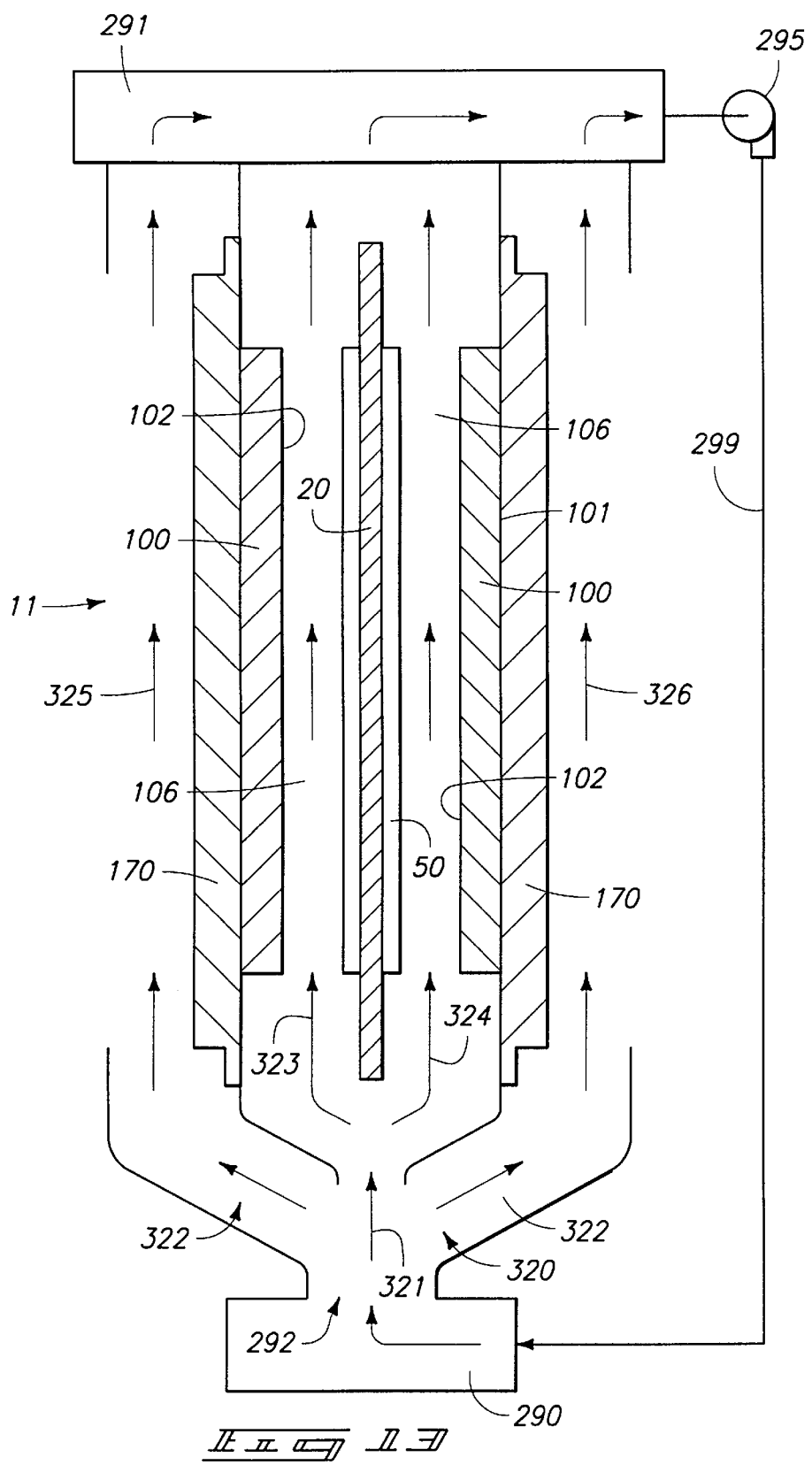
FIG. 13 is a fragmentary, schematic representation of an ion exchange membrane fuel cell module, and associated power systems of the present invention.

As best seen in the exploded view of FIGS. 6 and 9, the ion exchange membrane fuel cell module 11 includes a plurality of membrane electrode diffusion assemblies generally indicated by the numeral 100. Each of the membrane electrode diffusion assemblies have an anode side 101, and an opposite cathode side 102. Still further, each of the membrane electrode diffusion assemblies is defined by a peripheral edge 103, and further has formed in its anode side, a plurality of interlinking channels 104. The membrane electrode diffusion assembly 100, as noted above, is formed of a solid ion conducting membrane 105 which is sealably mounted or received in each of the respective cavities 34. In this arrangement, the cathode side 102 of each membrane electrode diffusion assembly is held in spaced relation relative to the support member 20 by means of the deformable electrically conductive members 70 of the cathode current collector 60. This spacial arrangement, which is provided by the cathode current collector, facilitates, in part heat dissipation from the module 11. This will be discussed in greater detail below. As described, above, the membrane electrode diffusion assembly 100; associated cathode current collector 60; and support member 20 in combination, define a cathode air passageway 106 therebetween (FIGS. 10 and 13). The construction of a suitable membrane electrode diffusion assembly was described in our U.S. patent application Ser. No. 08/979,853, which was filed on Nov. 20, 1997, and which is now U.S. Pat. No. 6,030,718. This earlier patent is incorporated by reference herein, and further discussion regarding the construction of the membrane electrode diffusion assembly is not undertaken herein.

As will be appreciated, from a study of FIG. 13, the cathode air passageway 106 is defined or otherwise oriented on each side 26 of the support member 20. Therefore, the module 11 has a bifurcated cathode air flow. This will also be discussed in greater detail hereinafter. As will be appreciated, while the earlier described membrane electrode diffusion assembly was directed to a proton exchange membrane, this invention is not limited solely to proton exchange membranes, but also may utilize anion exchange membranes.

Figure 7:
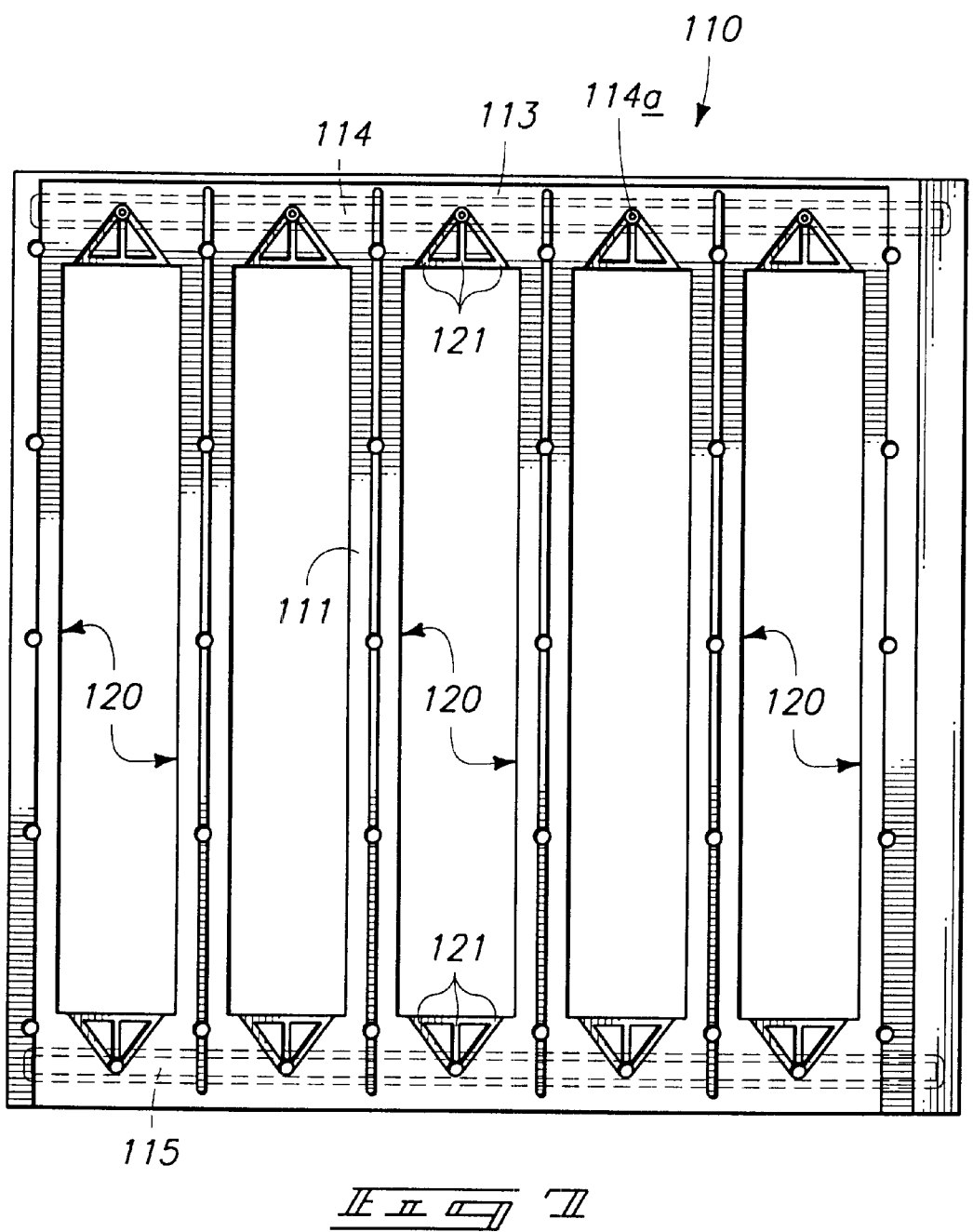
FIG. 7 is a fragmentary, side elevational view of a fuel distribution assembly utilized with the ion exchange membrane fuel cell module of the present invention.
Figure 11:
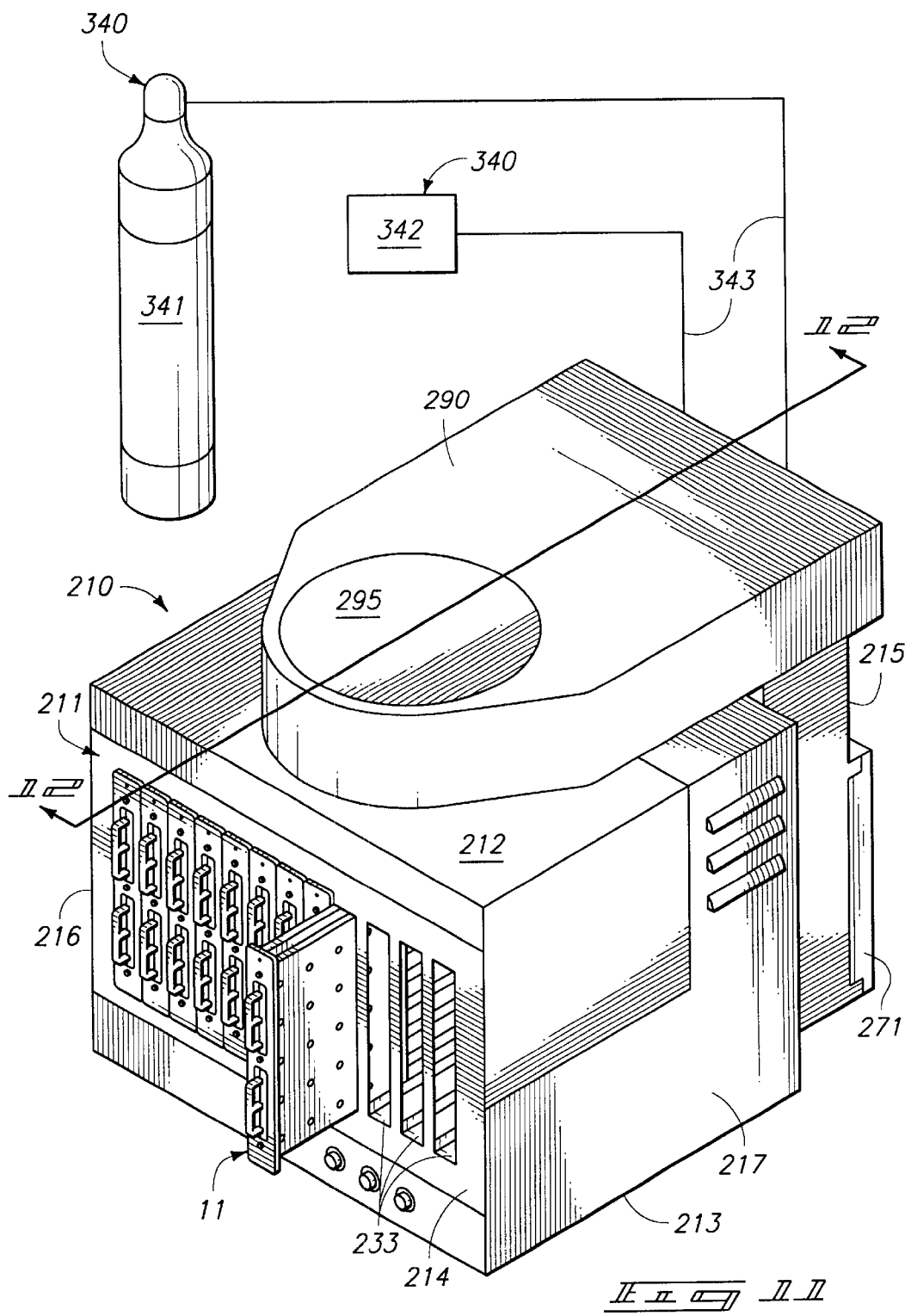
FIG. 11 is a perspective view of an ion exchange membrane fuel cell power system of the present invention.

As best seen by reference to FIGS. 7 and 9, a fuel distribution assembly, generally indicated by the numeral 110, is coupled in fluid flowing relation relative to the anode side 101 of each of the membrane electrode diffusion assemblies 100. Each fuel distribution assembly 110 is coupled with a source of a fuel 340 which may be substantially pure, or which is diluted to various degrees. If fabricated in the nature of a proton exchange membrane fuel cell, the dilute fuel supply would include hydrogen. The concentration of the hydrogen in the dilute fuel would be in a range of about 30% to about 80% by volume. When supplied with this dilute fuel mixture (regardless of the type), the ion exchange membrane fuel cell 10 produces an average current density of at least about 350 mA per square centimeter of surface area of the anode side 101 at a nominal voltage of 0.5 volts. Further, the interlinking channels 104 formed in the surface of the anode side 101 facilitate the distribution of the dilute fuel substantially about the entire surface area of the anode side 101. In this arrangement, if contaminants are introduced by way of the dilute fuel mixture or other blockage occurs, the interlinking channels 104 provide a convenient means by which the fuel may reach substantially the entire surface area of the anode side 101, even though some portions of the interlinking channels 104 may be blocked or otherwise substantially occluded. The dilute fuel 340 may be supplied by means of a reactor 342 which receives a hydrocarbon based fuel, and then through a chemical reaction fractionates the hydrocarbon source to liberate a dilute stream of hydrogen which is mixed with other substances. In the alternative, the fuel may be supplied by a pressurized container 341. These alternative arrangements are shown in FIG. 11 and will be discussed in greater detail hereinafter.

Figure 8:
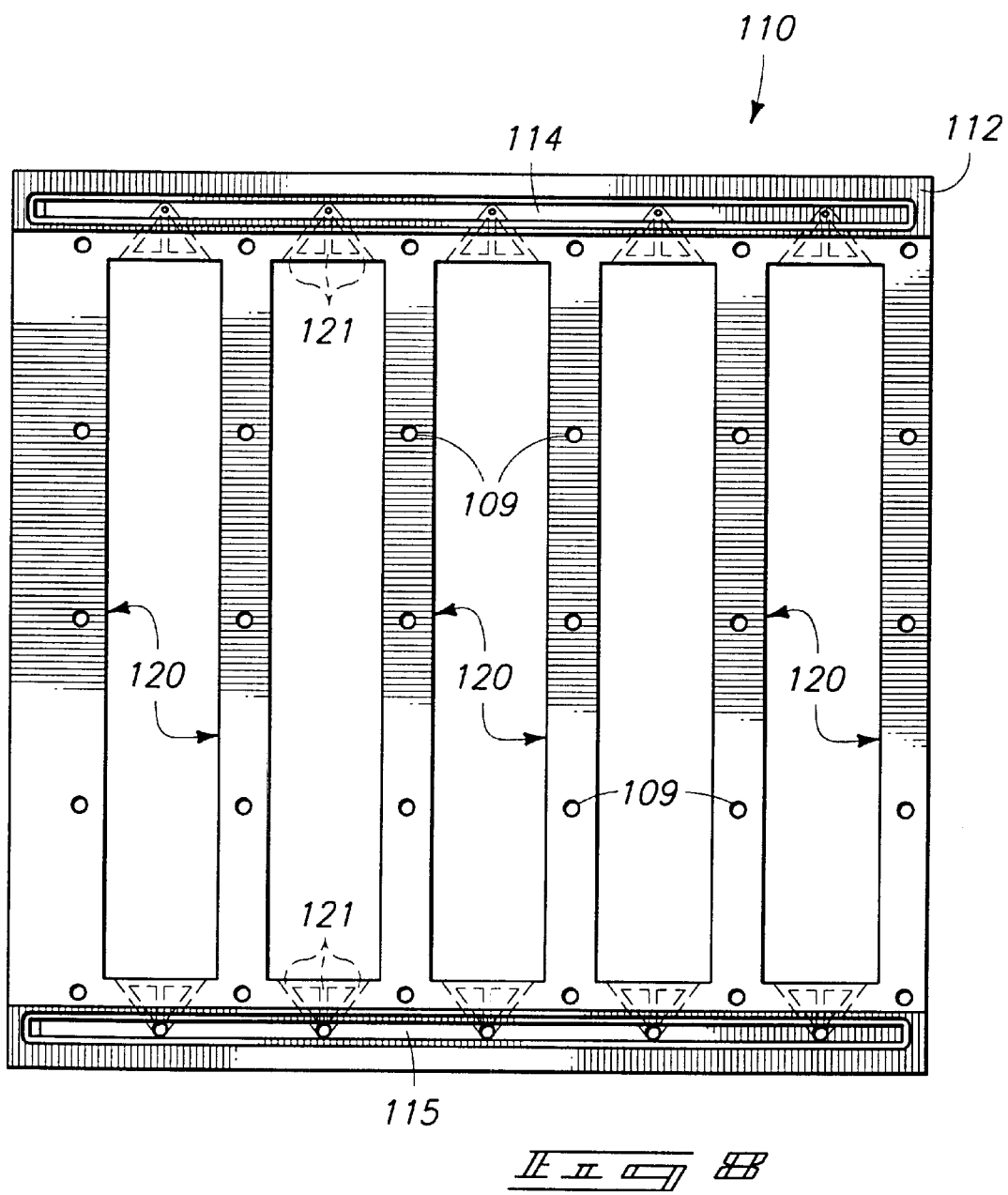
FIG. 8 is a second, fragmentary, side elevational view of the fuel distribution assembly taken from a position opposite to that seen in FIG. 7.

As best seen by reference to the exploded view as shown in FIG. 9 and FIG. 1, the ion exchange membrane fuel cell 10 of the present invention includes a pair of fuel distribution assemblies 110 which are individually mounted in fluid flowing relation relative to the anode side 101 of the respective membrane electrode diffusion assemblies 100. As best seen in FIGS. 7 and 8, each of the fuel distribution assemblies 110 include a main body 111 which has an inside facing surface 112, (FIG. 8) and an outside facing surface 113 (FIG. 7). The main body 111 further defines an intake plenum 114, and an exhaust plenum 115. Further, a fluid coupling 116 (FIG. 1) is mounted in fluid flowing relation relative to the individual intake and exhaust plenums 114 and 115 respectively. A reduced dimension orifice 114A is formed in the main body and communicates with the intake plenum. This reduced diameter orifice operates to create a pressure differential in the respective apertures or cavities 120 during certain operational conditions to facilitate the clearance of contaminants or other obstructions which may be blocking any of the channels 104 which are formed in the membrane electrode diffusion assembly 100. A plurality of cavities or apertures 120 are formed in the main body 111, and extend between the inside and outside facing surfaces 112 and 113 respectively. The cavities or apertures 120 are disposed in spaced relation, one to the other, and when assembled, the cavities 120 receive the individual membrane electrode diffusion assemblies 100. As best seen in FIG. 7, a plurality of channels or passageways 121 are formed in the main body 111, and couple the individual cavities 120 in fluid flowing relation with the respective intake and exhaust plenums 114 and 115. Additionally, a plurality of fastener apertures 109 are formed in the main body. As further seen in FIG. 9, a sealing member 122 lies in covering relation relative to the individual channels 121.

As best seen in FIG. 1, a plurality of conduits 150 couple in fluid flowing relation the fuel coupling 40 with the fuel distribution assembly 110. Two of the conduits designated as 151 allow a dilute fuel mixture to be delivered by way of the intake plenum 114 to the individual membrane electrode diffusion assemblies 100. Thereafter, any remaining fuel, and associated by-products of the chemical reaction are received back into the exhaust plenum 115 and then flow by way of conduits 152 to the fuel coupling 40 and then to the exhaust passageway 44.

First and second pressure sensitive adhesive seals 123 and 124, respectively are provided, and are disposed in juxtaposed relation relative to the opposite inside and outside facing surfaces 112 and 113 respectively. Each of the seals 123 and 124 have apertures 125 formed therein which are substantially coaxially oriented relative to the respective cavities 120. As will be recognized, the cavities 120 which are formed in the main body 111 of the fuel distribution assembly 110, matingly cooperate and are substantially coaxially aligned with the individual cavities 34 which are formed in the nonconductive support plate 20. As will be recognized and following the assembly of same, the respective membrane electrode diffusion assemblies 100 are individually received in mating relation in each of the cavities 120 and 34 which are defined by both the fuel distribution assembly 110, and the support member 20. Further, a plurality of fastener apertures 126 are formed in the individual seals 123, and 124, and are operable to receive fasteners which will be discussed in greater detail hereinafter.

Lying in immediate juxtaposed relation relative to the second pressure sensitive adhesive seal 124 is an anode current collector which is generally designated by the numeral 140. Additionally, and as seen in FIG. 9, a substantially rigid sealing plate 130 is provided and which is juxtaposed relative to the cathode side 102 of the membrane diffusion assembly 100. The sealing plate 130 has a main body 131 which defines a plurality of apertures 132 which matingly receive, in part, the respective membrane electrode diffusion assemblies 100. Still further, the main body has a plurality of fastener apertures 133 formed therein and which when assembled, are substantially coaxially aligned with the aforementioned fastener apertures formed in the earlier described portions of the fuel cell module 11. Each anode current collector lies in ohmic electrical contact thereagainst the anode side 101 of each of the membrane electrode diffusion assemblies 100 and further is oriented in heat receiving relation relative thereto. The anode current collector 140 has an electrically conductive main body 141 (which may be fabricated from nickel, or a nickel coated copper) and which has an inside facing surface 142 which lies against the anode side 101 of the membrane electrode diffusion assembly 100, and an opposite outside facing surface 143. Still further, a plurality of fastener apertures 144 are formed in the main body and are operable to be substantially coaxially aligned relative to the other fastener apertures 126 formed in the various seals 123, 124, and in the fuel distribution assembly 110. Further, the main body 141 has a plurality of electrical contact members 145 which are operable, when assembled, to make ohmic electrical contact with the conductive areas 93 which are formed along the main body 81 of the current conductor assembly 80. This is best seen in FIG. 10.

As seen in FIG. 9, an electrically insulative member or gasket 160 is mounted or oriented in juxtaposed relation relative to the outside facing surface 143, of the anode current collector 140. This insulative member has a main body 161 which has an inside facing surface 162 which rests in contact with the outside facing surface 143 of the anode current collector, and further has an outside facing surface 163. Further, a plurality of fastener apertures 164 are operable to be coaxially aligned with the previously described fastener apertures formed in the remaining parts of the ion exchange membrane fuel cell 10.

As best seen in FIGS. 9 and 10, an anode heat sink 170 is oriented in juxtaposed relation relative to the insulative member 160, and further, is mounted in heat receiving relation relative to the anode sides 101 of each of the membrane electrode diffusion assemblies 100 to conduct heat energy generated by the ion exchange membrane module 11 away from the membrane electrode diffusion assembly 100. In this arrangement, the fuel distribution assembly 110 is located substantially between the anode side 101 of the membrane electrode diffusion assembly 100, and the anode current collector 140. The anode heat sink 170 has a main body 171 which has an inside facing surface 172, which lies in juxtaposed relation relative to the insulative member 160, and an opposite outside facing surface 173. Similarly, and as discussed above, numerous fastener apertures 174 are formed therein, and which are substantially coaxially aligned with the remaining fastener apertures which are formed in the earlier disclosed portions of the ion exchange membrane fuel cell module 11. Fasteners 175 are provided and are received in these coaxially aligned fastener apertures such that the module is held firmly together. These fasteners 175 along with the respective current collectors 60 create pressure sufficient to allow the individual current collectors 60 and 140 to make effective ohmic electrical contact with the anode and cathode sides 101 and 102 respectively of the membrane electrode diffusion assembly 100. As will be recognized from the discussion above, the anode current collector 140 is substantially electrically isolated from the anode heat sink 170. Additionally, the anode heat sink has sufficient thermal conductivity such that it substantially inhibits the formation of a temperature gradient across the membrane electrode diffusion assembly 100 during operation of the ion exchange membrane fuel cell 10.

A handle assembly is generally indicated by the numeral 190 and is best seen in FIG. 2. As shown therein, the handle assembly 190 has a back plate generally indicated by the numeral 191, and which is defined by a front surface 192, and an opposite rear surface 193. Formed through the front and rear surfaces is an aperture 194 which matingly receives the member 84 which is mounted on the main body 81 of the current conductor assembly 80. Still further, a pair of handles 195 are fastened on the front surface 192, and additionally, a plurality of fastening apertures 196 are formed through the front and rear surfaces 192 and 193 and are operable to receive fasteners 197 which threadably engage the fastener apertures 31, which are formed in the forward edge 23 of the support member 20. The handles permit the module 11 to be easily manipulated by hand, and removed without the use of any tools, when utilized with a subrack which will be discussed in greater detail hereinafter.

Figure 12:
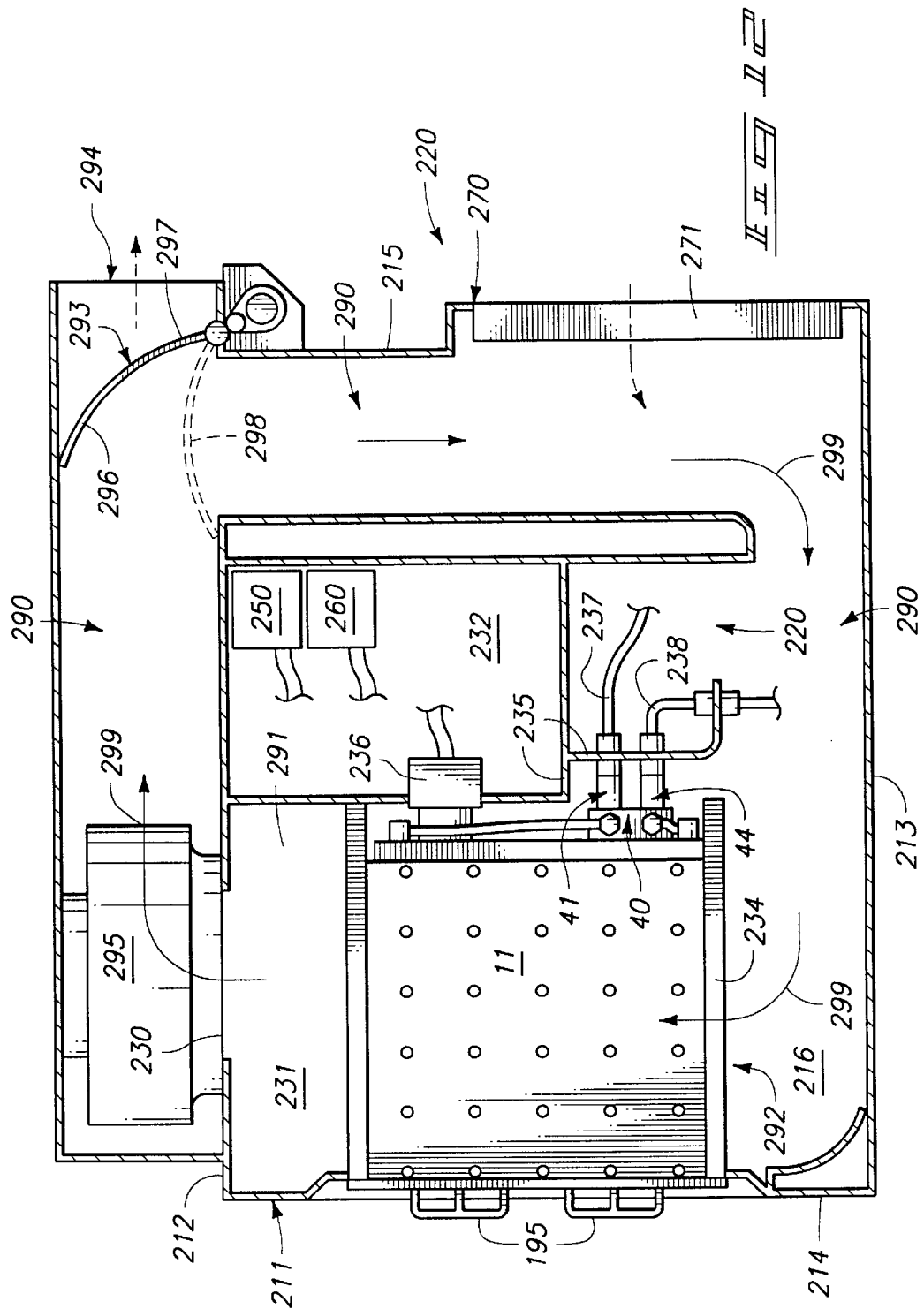
FIG. 12 is a fragmentary, transverse, vertical sectional view taken from a position along line 12—12 of FIG. 11.

Referring more specifically now to FIGS. 11 and 12, an ion exchange membrane fuel cell power system is shown and which includes a subrack generally indicated by the numeral 210. This subrack releasably supports a plurality of ion exchange membrane fuel cell modules 11 in an operable arrangement. The subrack 210 includes a principal enclosure 211. The principal enclosure is defined by a top surface 212; bottom surface 213; front sidewall 214; rear sidewall 215; left sidewall 216, and right sidewall 217. The respective sidewalls 212 through 217 define an internal cavity 220. In this arrangement, the principal enclosure will receive multiple modules 11, each enclosing a membrane electrode diffusion assembly 100. As seen in FIG. 11, the ion exchange membrane fuel cell power system is configured in a manner where at least one of the modules 11 can be easily removed from the ion exchange membrane fuel cell power system by hand, while the remaining modules continue to operate. As noted above this removal is normally accomplished without the use of any tools, however it may be neccessary in some commercial or industrial applications where vibration, and other outside physical forces may be imparted to the system, to use threaded fasteners and the like to releasably secure the individual modules to the subrack to prevent the unintentional displacement or dislocation of the respective modules from the subrack. If utilzed, the hand tools which will be employed will be simple hand tools, and the removal will be accomplished in minutes, as opposed the prior art stack arrangements where replacement of a damaged membrane electrode assembly (MEA) may take hours to accomplish.

As best seen by reference to FIG. 12, an aperture 230 is formed in the top surface 12 of the subrack 210, and further, the cavity 220 is comprised of a first or fuel cell module cavity 231, and a second cavity or electrical control bay 232. As best seen by reference to FIG. 11, a plurality of individual module apertures 233 are formed in the front surface 214 of the principal housing 211, and are operable to individually receive the respective fuel cell modules 11, and position them in predetermined spaced relation, one to the other. The fuel cell module cavity 231 is further defined by a supporting member or shelf 234 which orients the individual fuel cell modules 11 in a predetermined substantially upright orientation within the cavity 231. Additionally, the fuel cell module cavity 231 is defined by a rear wall 235 which supports a DC bus 236 in an orientation which will allow it to releasably, matingly, electrically couple with the current conductor assembly 80 which is borne by the fuel cell module 11. Yet further, and as seen in the cross sectional view of FIG. 12, the rear wall 234 further supports a fuel supply line 237 and a byproduct removal line 238. These are operable to be releasably coupled in fluid flowing relation with respect to the fuel delivery passageway 41 and the exhaust passageway 44 of the fuel coupling 40. As best seen in FIG. 12, the second cavity or electrical control bay 232 encloses a digital or analog controller 250 which is electrically coupled with the respective ion exchange membrane fuel cell modules 11, and a power conditioning assembly 260 which is electrically coupled with the DC bus 236, and the controller 250, and which is operable to receive the electrical power produced by the ion exchange membrane fuel cell modules 11. The operation of the controller and power conditioning assembly and related control circuitry is discussed in our prior U.S. application Ser. Nos. 09/108,667 and 09/322,666, which are incorporated by reference herein, and are not discussed in further detail in this application. As further seen in FIG. 12, an aperture 270 is formed in the rear wall 215 of the principal enclosure 211, and is operable to receive an air filter 271 which is operable to remove particulate matter from an outside ambient air stream passing therethrough and into the principal enclosure 211.

As best seen by the cross sectional view in FIG. 12, the subrack 210 includes an air distribution plenum which is coupled in fluid flowing relation relative to each of the ion exchange membrane fuel cell modules 11. The air distribution plenum 290 has a first or intake end 291 which receives both air which has previously come into contact with each of the ion exchange fuel cell modules 11, and air which comes from outside of the respective ion exchange membrane fuel cell modules. Further, the air distribution plenum has a second or exhaust end 292 which delivers an air stream to each of the ion exchange fuel cell modules 11. Disposed intermediate the first or intake end 291, and the second or exhaust end 292 is an air mixing valve 293 which is coupled to the air distribution plenum 290, and which meters the amount of air which is passed through the respective ion exchange membrane fuel cell modules 11 and is recirculated back to the ion exchange fuel cell membrane modules and by way of the air filter 271. As illustrated the mixing valve 293 selectively occludes an aperture 294 which is formed in the rear wall 215 of the subrack 210. An air movement assembly such as a fan 295 is provided and is mounted along the air distribution plenum 290. As shown in FIG. 12, the air movement assembly is positioned near the intake end 291, and is substantially coaxially aligned with the aperture 230 which is formed in the top surface 212 of the subrack 210. The air mixing valve and the fan assembly 293 and 295 respectively are electrically coupled with the controller 250 and are controlled thereby. The air mixing valve 293 comprises a pivotally movable valve member 296 which can be moved from a first occluding position 297 relative to the aperture 294, and a second, substantially non-occluding position 298 as shown in phantom lines. As will be recognized when the valve member 296 is in the second non-occluding position, air received in the intake end 291 and which has previously passed through the individual fuel cell modules will pass out of the principal enclosure 211 and then be exhausted to the ambient environment. On the other hand, when the valve member 296 is in the occluding position 297 air from the intake end 291 which has passed through the fuel cell module 11 will return to the exhaust end and then pass through the modules 11 and return again to the intake end. As will be recognized by controlling the relative position of the valve member 296, temperature as well as relative humidity of the air stream 299 can be easily controlled. Still further, in the occluding position 297, air from the ambient will continue to enter the air distribution plenum by means of the air filter 270.

More specifically, the air stream 299 which is supplied to the fuel cell modules is provided in an amount of at least about 5 to about 1000 times the volume required to support a fuel cell chemical relation which produces water vapor as a byproduct. The present air plenum arrangement provides a convenient means by which the air stream delivered to the cathode side 102 can be humidified by the water vapor generated as a byproduct of the chemical reaction taking place on the cathode. Additionally, during cold operating conditions, this same air, which has now been heated by each of the fuel cell modules 11, will contribute to bringing the entire fuel cell up to normal operating temperatures. Further, the air mixing valve 293 limits the amount of air which has previously passed through the modules 11 and which is added to the air distribution plenum 290. This resulting recirculated air stream and fresh ambient air forms an air stream having substantially optimal operating characteristics which maximizes the current densities and outputs of the respective membrane electrode diffusion assemblies enclosed within each of the modules 11.

Referring now to FIG. 13, what is shown is a greatly simplified, exaggerated, partial, and cross-sectional view of an ion exchange membrane fuel cell module 11 positioned in an operational relationship relative to the air distribution plenum 290. This particular sectional view, which does not include many of the subassemblies previously discussed, is provided to illustrate the principals that will be set forth below. As seen in FIGS. 12 and 13, and as discussed above, the subrack 210 includes an air distribution plenum 290 which provides a stream of air 299 to each of the ion exchange fuel cell modules 11 which are received in an operational position on the shelf or supporting member 234. The air stream 299 exists from the exhaust end 292 and then becomes a bifurcated air flow which is generally indicated by the numeral 320. The bifurcated air flow 322 comprises a first cathode air stream 321, which is received in the respective ion exchange membrane fuel cell modules 11; and a second anode heat sink air stream which is generally indicated by the numeral 322. As will be recognized by a study of FIG. 13, the first cathode air stream 321 enters the ion exchange membrane fuel cell module 11, and is further bifurcated into a first component 323 which moves along one of the cathode air passageways 106 which is defined on one side of the support member 20. Further, the first cathode air stream 321 has a second component 324 which passes along the cathode air passageway 106 on the opposite side of the support member 20. As will be appreciated, the bifurcated cathode air stream 321 provides the necessary oxidant (oxygen in the ambient air stream) to the cathode side 102 of the membrane electrode diffusion assembly 100. Yet further, the cathode air flow operates to remove less than a preponderance of the heat energy generated by the membrane electrode diffusion assembly 100 while it is in operation. As will be recognized the cathode air flow is facilitated by the respective cathode current collectors 60 which create in part, the cathode air passageway 106. The anode heat sink air stream 322 is further bifurcated into a first component 325 and a second component 326, both of which individually move along the opposite sides 16 of the ion exchange membrane fuel cell module 11, and over each of the anode heat sinks 170. As the anode heat sink air stream components 325 and 326 move over the opposite anode heat sinks 170, the anode heat sink air stream operates to remove a preponderance of the heat energy generated by the ion exchange membrane fuel cell module 11 during operation. Therefore, it will be recognized that the present invention provides an ion exchange fuel cell module 11 which has a bifurcated air flow 320 which regulates the operational temperature of the ion exchange membrane fuel cell module by removing the heat energy generated therefrom.

Referring now to FIG. 11, and as earlier discussed, the individual ion exchange membrane fuel cell modules 11 and the subrack 210 comprise in combination a fuel cell power system which is coupled in fluid flowing relation relative to a source of a substantially pure or dilute fuel generally indicated by the numeral 340. The fuel gas supply may comprise a source of bottled and compressed fuel gas generally indicated by the numeral 341, or a fuel stream which is provided by a chemical reactor, or reformer 342 which produces the fuel stream for use by the individual ion exchange fuel cell modules 11. A conduit 343 would couple either fuel gas supply 340 with the respective ion exchange fuel cell modules 11 and the associated subrack 210. When a chemical reformer 342 is provided, the reformer would receive a suitable hydrocarbon stream such as natural gas, propane, butane, and other fuel gases and would thereafter, through a chemical reaction release a fuel stream which would then be delivered by way of the conduits 343. The present apparatus 10 may also include a fuel gas recovery and recycling system (not shown) which would recover or recapture unreacted fuel gas which has previously passed through the individual ion exchange fuel cell modules 11. This system, in summary, would separate the unreacted fuel gas and would return the unreacted fuel gas back to the individual ion exchange fuel cell modules for further use. This recovery system would be coupled with the byproduct removal line 238.

Operation

The operation of the described embodiment of the present invention is believed to be readily apparent and is briefly summarized at this point.

In its broadest aspect, the present invention comprises an ion exchange membrane fuel cell which includes multiple modules 11 each enclosing a membrane electrode diffusion assembly 100, and wherein at least one of the modules 11 can be easily removed from the ion exchange membrane fuel cell, by hand, while the remaining modules continue to operate.

Another broad aspect of the present invention relates to an ion exchange membrane fuel cell which includes a module 11 enclosing a membrane electrode diffusion assembly 100 which has an active area 107 defined by a surface area, and which produces an average current density of at least about 350 mA per square centimeter of surface area when supplied with a dilute fuel 340 at a nominal voltage of 0.5 volts.

Another broad aspect of the present invention relates to an ion exchange membrane fuel cell power system which includes a plurality of discrete ion exchange membrane fuel cell modules 11 and which produce a given amount of heat energy, and wherein each of the discrete ion exchange membrane fuel cell modules have an anode heat sink 170 which removes a preponderance of the heat energy generated by the respective ion exchange membrane fuel cell modules. This is best appreciated by a study of FIG. 13.

Another broad aspect of the present invention is to provide an ion exchange fuel cell 10 having an ion exchange membrane 100 have opposite sides and wherein an anode 101 and cathode 102 are individually positioned on the opposite sides of the ion exchange membrane.

A fuel supply 340 is provided to the anode, and an oxidant supply 321 comprising ambient air is supplied in a cathode air stream 323 and 324 which has a volume of at least about 5 to about 1000 times the volume required to support a fuel cell chemical reaction which provides water vapor as a byproduct.

Another broad aspect of the present invention is to provide an ion exchange membrane fuel cell 10 having a module 11 which encloses a membrane electrode diffusion assembly 100 having opposite anode 101 and cathode 102 sides, and which, during operation, generates electricity and produces heat energy as a byproduct. The ion exchange membrane fuel cell 100 further has a cathode current collector 60 which rests in ohmic electrical contact with the cathode side of the membrane electrode diffusion assembly, and which exerts force on the membrane electrode diffusion assembly, and conducts, in part, the heat energy generated by the membrane electrode diffusion assembly away from the membrane electrode assembly.

Yet still another broad aspect of the present invention relates to an ion exchange fuel cell module 11 which has a bifurcated air flow 320 which regulates the operational temperature of the ion exchange membrane fuel cell module by removing the heat energy generated therefrom.

Yet still further, another broad aspect of the present invention relates to an ion exchange fuel cell module 11 which has a pair of membrane electrode diffusion assemblies 100 which are disposed in spaced relation, one to the other, and wherein each membrane electrode diffusion assembly 100 has an anode and an opposite cathode side 101 and 102 respectively. In this arrangement, the cathode side 101 of each of the membrane electrode diffusion assemblies are proximally related, and the anode sides 101 are distally related, and wherein each cathode side defines in part a bifurcated cathode air passageway 106.

Referring to FIGS. 3 and 9, an ion exchange membrane fuel cell module 11 of the present invention is shown and which includes a pair of membrane electrode diffusion assemblies 100 each having opposite anode and cathode sides 101 and 102, and wherein anode and cathode current collectors 140 and 160 respectively, are electrically coupled with the opposite anode and cathode sides. The ion exchange membrane fuel cell module 100 further has a support member 20 disposed between the pair of membrane electrode diffusion assemblies 100, and wherein the cathode side 102 of each of the membrane electrode diffusion assemblies faces the support member. The ion exchange membrane fuel cell module defines a cathode air passageway 106 which is located between the support member 20 and the cathode side 102 of each of the membrane electrode diffusion assemblies. A fuel distribution assembly 110 is provided, and is coupled in fluid flowing relation relative to the anode side 101 of each membrane electrode diffusion assembly 100. Finally, an anode heat sink 170 is provided and oriented in heat receiving relation relative to the anode side 101 to facilitate the removal of a preponderance of the heat energy generated by each membrane electrode diffusion assembly.

As presently conceived, the ion exchange membrane fuel cell module 11 of the present invention includes a support member 20 having opposite sides 26 and which defines opposing cavities 34. A cathode current collector 60 is received in each of the cavities 34 which is defined by the support member 20. A membrane electrode diffusion assembly 100 is matingly received in each of the cavities 34, and has opposite anode and cathode sides 101 and 102 respectively. The cathode side 102 of the individual membrane electrode diffusion assemblies 100 cooperates with each cavity 34. Further, the cathode current collector 60 lies in ohmic electrical contact with the cathode side 102 of the membrane electrode diffusion assembly 100. A fuel distribution assembly 110 cooperates with the support member 20 and is disposed in fluid flowing relation relative to the anode side 101 of each of the membrane electrode diffusion assemblies 100. An anode current collector 140 is provided and disposed in ohmic electrical contact with the anode side 101 of each of the membrane electrode diffusion assemblies. In this arrangement, the fuel distribution assembly 110 is oriented between the membrane electrode diffusion assemblies and the adjacent anode current collector 140. An anode heat sink 170 is disposed in heat removing relation relative to the membrane electrode diffusion assembly 100. As seen in FIG. 13, the ion exchange membrane fuel cell module has a bifurcated air flow 320 comprising a cathode air stream 321 which passes into contact with the cathode side 102 of each of the membrane electrode diffusion assemblies. Yet further, the bifurcated air flow includes an anode airstream 322 which passes into heat receiving relation relative to the anode heat sink 170. The heat energy generated by the membrane electrode diffusion assembly is dissipated from the anode heat sink to the anode air stream.

Therefore, it will be seen that the present fuel cell module 11 and associated power system has numerous advantages over the prior art techniques and teachings including the elimination of many of the balance of plant subassemblies typically utilized with stack-like fuel cell devices. Moreover, in view of the highly efficient manner in which heat is dissipated from the fuel cell modules, enhanced current densities are achieved and further, the fuel cell module of the present invention is enabled, through the present design, to accept and effectively utilize a dilute fuel mixture, yet simultaneously deliver current densities equal to or greater than that described in earlier patents, and patent applications which are incorporated by reference herein. Finally, the present invention provides many advantages over the prior art fuel cells which employ stack-like arrangements by reducing or eliminating the control measures which have been provided for use with same. The elimination of these several control measures increases the performance capabilities of the present design while simultaneously reducing the capital costs to generate a given amount of electrical power.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An ion exchange membrane fuel cell, comprising:
multiple modules each enclosing a membrane electrode diffusion assembly, and wherein at least one of the modules can be easily removed from the ion exchange membrane fuel cell, by hand, while the remaining modules continue to operate, and wherein each of the modules produce heat energy during operation, and wherein each of the modules have an anode heat sink which removes a preponderance of the heat energy generated by the respective modules.

2. An ion exchange membrane fuel cell, comprising:
multiple modules each enclosing a membrane electrode diffusion assembly, and wherein at least one of the modules can be easily removed from the ion exchange membrane fuel cell, by hand, while the remaining modules continue to operate, and wherein each of the modules produce heat energy during operation, and wherein each module has a bifurcated air flow which regulates the operational temperature of each module by removing the heat energy therefrom.

3. An ion exchange membrane fuel cell comprising:
multiple modules each enclosing a pair of membrane electrode diffusion assemblies disposed in spaced relation, one to the other, and wherein each membrane electrode diffusion assembly has an anode side, and an opposite cathode side, and wherein the cathode side of each membrane electrode diffusion assembly is proximally related, and the respective anode sides are distally related, and wherein each cathode side defines, in part, a cathode air passageway, and wherein at least one of the modules can be easily removed from the ion exchange membrane fuel cell, by hand, while the remaining modules continue to operate.

4. An ion exchange membrane fuel cell as claimed in claim 3, and wherein each of the modules produce heat energy during operation, and wherein a cathode current collector rests in ohmic electrical contact with the cathode side of the membrane electrode diffusion assembly and exerts force on the membrane electrode diffusion assembly, and conducts, in part, the heat energy generated by the membrane electrode diffusion assembly away from the membrane electrode diffusion assembly.

5. An ion exchange membrane fuel cell comprising:
multiple modules each enclosing a membrane electrode diffusion assembly which has opposite anode an cathode sides, and wherein at least one of the modules can be easily removed from the ion exchange membrane fuel cell, by hand, while the remaining modules continue to operate, and wherein each module further has an anode heat sink disposed in heat removing relation relative to the anode side of the membrane electrode diffusion assembly, and wherein each module further has a bifurcated air flow comprising a cathode air stream and an anode heat sink air stream, and wherein each module produces heat energy during operation, and wherein less than a preponderance of the heat energy is removed by the cathode air stream.

6. An ion exchange membrane fuel cell as claimed in claim 5, wherein a preponderance of the heat energy is removed by the anode heat sink.

7. An ion exchange membrane fuel cell comprising:
a module enclosing a membrane electrode diffusion assembly which has opposite anode and cathode sides, and which has an active area defined by a surface area, and which produces an average current density of at least about 350 mA per square centimeter of surface area when supplied with a fuel having a hydrogen concentration of about 30% to about 80% at a nominal voltage of at least about 0.5 volts, and wherein during operation, the ion exchange membrane fuel cell produces heat energy, and wherein the ion exchange membrane fuel cell has an anode heat sink disposed in heat removing relation relative to the anode side of the membrane electrode diffusion assembly to remove a preponderance of the heat energy generated by the membrane electrode diffusion assembly.

8. An ion exchange membrane fuel cell as claimed in claim 7, and wherein the anode has a plurality of channels formed therein, and wherein the module has a cathode air flow which removes less than a preponderance of the heat energy generated by the membrane electrode diffusion assembly.

9. An ion exchange membrane fuel cell as claimed in claim 7, wherein the membrane electrode diffusion assembly has a cathode air flow, and wherein the anode heat sink and the cathode air flow remove the heat energy generated by the membrane electrode diffusion assembly during operation.

10. An ion exchange membrane fuel cell comprising:
a module enclosing a membrane electrode diffusion assembly which has opposite anode and cathode sides and which produces heat energy during operation, and which further produces an average current density of at least about 350 mA per square centimeter of surface area when supplied with a fuel which has a hydrogen concentration of about 30% to about 80%, and wherein the module further has a bifurcated air flow for removing the heat energy generated by the membrane electrode diffusion assembly.

11. An ion exchange membrane fuel cell as claimed in claim 10, wherein the module can be manipulated by hand, and further comprises:
an electrically nonconductive support member having opposite sides and defining a pair of substantially opposed cavities, and wherein a pair of membrane electrode diffusion assemblies each having opposite anode and cathode sides are individually sealably received in the respective cavities, and wherein each cathode side is oriented in spaced relation relative to the nonconductive support member and defines a cathode air passageway therebetween;
an anode heat sink disposed in heat removing relation relative to the anode side of each membrane electrode diffusion assembly; and
wherein the bifurcated air flow delivered to the module comprises a cathode stream which is delivered to the cathode air passageway, and an anode heat sink stream which passes over the anode heat sink, and wherein the bifurcated air flow regulates the operational temperature of the ion exchange membrane fuel cell by the removal of heat energy generated during operation.

12. An ion exchange membrane fuel cell as claimed in claim 10, wherein the module can be manipulated by hand, and further comprises:
an electrically nonconductive support member having opposite sides and defining a pair of substantially opposed cavities, and wherein a pair of membrane electrode diffusion assemblies each having opposite anode and cathode sides are individually sealably fitted in the respective cavities, and wherein each cathode side is oriented in spaced relation relative to the nonconductive support member and defines a cathode air passageway therebetween;
an anode heat sink disposed in heat removing relation relative to the anode side of each membrane electrode diffusion assembly; and
wherein the bifurcated air flow delivered to the module comprises a cathode stream which is delivered to the cathode air passageway, and an anode heat sink stream which passes over the anode heat sink, and wherein the cathode air stream is further bifurcated and delivered to each cathode air passageway, and wherein the bifurcated air flow comprising the cathode stream and the anode heat sink stream regulates the operational temperature of the ion exchange membrane fuel cell by the removal of heat energy generated during operation.

13. An ion exchange membrane fuel cell comprising:
a module enclosing a pair of membrane electrode diffusion assemblies which are disposed in spaced relation one to the other, and wherein each membrane electrode diffusion assembly has opposite anode and cathode sides, and further has an active area defined by a surface area, and which produces an average current density of at least about 350 mA per square centimeter of surface area when supplied with a fuel at a nominal voltage of at least about 0.5 volts, and wherein the cathode sides of each membrane electrode diffusion assembly are proximally related, and wherein the anode sides of each membrane electrode diffusion assembly are distally related, and wherein each cathode side defines in part a bifurcated cathode air passageway.

14. An ion exchange membrane fuel cell as claimed in claim 13, and wherein the module further comprises a cathode current collector which is juxtaposed relative to the cathode side of the membrane electrode diffusion assembly and which defines, in part, the cathode air passageway, and wherein the fuel cell module further has a bifurcated air flow, a portion of which is delivered to the cathode air passageway, and wherein the bifurcated air flow regulates the operational temperature of the membrane electrode diffusion assembly.

15. An ion exchange membrane fuel cell power system, comprising:

a plurality of discrete ion exchange membrane fuel cell modules which produce heat energy, and wherein each of the discrete ion exchange membrane fuel cell modules have an anode heat sink which removes a preponderance of the heat energy generated by the ion exchange membrane fuel cell modules.

16. A power system as claimed in claim 15, wherein each discrete ion exchange membrane fuel cell module has at least two membrane electrode diffusion assemblies which have opposite anode and cathode sides, and wherein each ion exchange membrane fuel cell module can be manipulated by hand.

17. A power system as claimed in claim 16, wherein each discrete ion exchange membrane fuel cell module has a pair of current collectors which are individually disposed in electrical contact with the opposite anode and cathode sides of each of the membrane electrode diffusion assemblies.

18. A power system as claimed in claim 17, wherein each anode heat sink is disposed in heat receiving relation relative to the anode side of each membrane electrode diffusion assembly and further applies force to each pair of current collectors and the individual membrane electrode diffusion assemblies.

19. A power system as claimed in claim 18, wherein each membrane electrode diffusion assembly has an active area having a surface area, and wherein each ion exchange membrane fuel cell module produces a current density of at least about 350 mA per square centimeter of active area at a nominal voltage of at least about 0.5 volts when supplied with a fuel.

20. A power system as claimed in claim 19, wherein the discrete ion exchange membrane fuel cell modules have a cathode air flow, and wherein less than a preponderance of the heat energy produced by the discrete ion exchange membrane fuel cell modules is removed by the cathode air flow.

21. A power system as claimed in claim 20, wherein each of the ion exchange membrane fuel cell modules comprise:

an electrically nonconductive support member having opposite sides and defining individual cavities, and wherein the respective membrane electrode diffusion assemblies are individually sealably mounted in the respective cavities, and disposed in spaced relation relative to the nonconductive support member, and wherein the nonconductive support member is oriented between the respective membrane electrode diffusion assemblies; and wherein the cathode current collector is disposed in ohmic electrical contact with the cathode side of each of the membrane electrode diffusion assemblies, and are individually received in each of the cavities defined by the nonconductive support member and disposed between the respective membrane electrode diffusion assemblies and the nonconductive support member; and a pair of fuel distribution assemblies individually mounted in fluid flowing relation relative to the anode side of each of the membrane electrode diffusion assemblies, and wherein the anode current collector is disposed in ohmic electrical contact with each of the anode sides; and wherein the anode heat sink is mounted in heat receiving relation relative to each of the anode sides to conduct heat energy generated by the ion exchange membrane module away from the membrane electrode diffusion assembly, and wherein the fuel distribution assembly is oriented substantially between the anode side and the anode current collector.

22. A power system as claimed in claim 21, wherein the cathode current collector comprises a deformable member which orients the membrane electrode diffusion assembly in spaced relation relative to the underlying nonconductive support member and exerts a force on same, and wherein a cathode air passageway is defined between the cathode current collector, membrane electrode diffusion assembly and the underlying nonconductive support member to facilitate the movement of air along the cathode side of the membrane electrode diffusion assembly, and wherein the cathode current collector further conducts heat energy away from membrane electrode diffusion assembly.

23. A power system as claimed in claim 22, wherein the fuel distribution assemblies are each coupled in fluid flowing relation with the fuel and are operable to supply the fuel to the anode side of each of the membrane electrode diffusion assemblies, and wherein each of the fuel distribution assemblies has a main body which defines an intake plenum, an exhaust plenum, and a cavity which is disposed intermediate the intake and exhaust plenums and which is coupled in fluid flowing relation thereto, and wherein the cavity formed in the respective fuel distribution assemblies matingly cooperates with the individual cavities defined by the nonconductive support plate.

24. A power system as claimed in claim 23, wherein the fuel distribution assembly has inside and outside facing surfaces, and wherein the cavity extends through the main body and between the inside and outside facing surfaces, and the anode current collector lies in ohmic electrical contact over a preponderance of the surface area of the anode side of the membrane electrode diffusion assembly and is further juxtaposed relative to the outside surface of the fuel distribution assembly.

25. A power system as claimed in claim 24, wherein the anode current collector is substantially electrically isolated from the anode heat sink, and wherein the anode heat sink substantially inhibits the formation of a temperature gradient across the membrane electrode diffusion assembly during operation of the ion exchange membrane fuel cell, and further conducts heat energy away from the membrane electrode diffusion assembly.

26. A power system as claimed in claim 25, wherein the individual ion exchange membrane fuel cell modules are releasably mounted on a subrack, and wherein the power system further comprises:

an air distribution plenum coupled in fluid flowing relation relative to each of the ion exchange membrane fuel cell modules, the air distribution plenum having an exhaust end which delivers an air stream to each of the ion exchange membrane fuel cell modules, and an opposite intake end which receives both air which has previously come into contact with each of the ion exchange membrane fuel cell modules, and air which comes from outside the respective ion exchange membrane fuel cell modules; and an air mixing valve coupled to the air distribution plenum and which controls the amount of air which has passed through the respective ion exchange membrane fuel cell modules and is recirculated back to same in the air stream.

27. A power system as claimed in claim 26, wherein the air stream delivered by the air distribution plenum is bifurcated into an anode heat sink stream, and a cathode stream, and wherein the cathode stream is supplied to the cathode air passageway, and wherein the anode heat sink stream passes over the anode heat sink and is operable to remove the preponderance of the heat energy generated by the ion exchange membrane fuel cell membrane, and wherein the air mixing valve is intermediate the intake end and exhaust end of the air distribution plenum.

28. A power system as claimed in claim 27, and which further comprises a DC bus, and wherein the anode and cathode current collectors are releasably electrically coupled with the DC bus when the ion exchange membrane fuel cell modules are oriented on the subrack.

29. A power system as claimed in claim 28, and further comprising:
 a controller electrically coupled with each of the ion exchange membrane fuel cell modules.

30. A power system as claimed in claim 28, and further comprising:
 a power conditioning assembly for receiving the electrical power produced by each of the discrete ion exchange membrane fuel cell modules.

31. An ion exchange membrane fuel cell power system comprising:
 an ion exchange membrane fuel cell module which produces heat energy, and which has a bifurcated air flow which regulates the operational temperature of the ion exchange membrane fuel cell module by removing the heat energy therefrom.

32. A power system as claimed in claim 31, wherein the ion exchange membrane fuel cell module has a membrane electrode diffusion assembly with opposite anode and cathode sides, and a pair of current collectors are individually disposed in ohmic electrical contact with the respective anode and cathode sides, and wherein the membrane electrode diffusion assembly has an active area having a surface area, and wherein the ion exchange membrane fuel cell module produces a current density of at least about 350 mA per square centimeter of active area at a nominal voltage of at least about 0.5 volts.

33. A power system as claimed in claim 31, and further comprising:
 a housing defining a cavity;
 a subrack mounted in the cavity and which is defined by the housing, and wherein the ion exchange membrane fuel cell module is releasably supported on the subrack;
 a DC bus mounted in the housing and adjacent the subrack and which is electrically coupled with the ion exchange membrane fuel cell module received on the subrack; and
 an air distribution plenum borne by the housing and coupled in fluid flowing relation relative to the ion exchange membrane fuel cell module.

34. A power system as claimed in claim 33, wherein the ion exchange membrane fuel cell module has a membrane electrode diffusion assembly having opposite anode and cathode sides, and wherein the ion exchange fuel cell module further comprises an anode heat sink, and wherein the air distribution plenum has an intake end and an opposite, exhaust end which provides the bifurcated air flow, which comprises an anode heat sink stream, and a cathode stream, and wherein the cathode stream is supplied to the cathode side of the membrane electrode diffusion assembly, and the anode heat sink stream passes over the anode heat sink and is operable to remove the preponderance of the heat energy generated by the ion exchange membrane fuel cell membrane.

35. A power system as claimed in claim 34, wherein an air mixing valve is operably coupled to the air distribution plenum and is mounted downstream of the ion exchange membrane fuel cell module, and wherein the intake end of the air distribution plenum receives a first air source which has previously come into contact with the ion exchange membrane fuel cell module, and a second air source which comes from outside the ion exchange membrane fuel cell module, and wherein the air mixing valve controls the relative amount of each of the respective air sources delivered to the ion exchange membrane fuel cell module.

36. A power system as claimed in claim 35, and further comprising:
 a controller electrically coupled with the ion exchange membrane fuel cell module, and the air mixing valve.

37. A power system as claimed in claim 31, wherein the ion exchange membrane fuel cell module has at least two membrane electrode diffusion assemblies which have opposite anode and cathode sides, and wherein the ion exchange membrane fuel cell module can be manipulated by hand, and wherein anode sides each have channels formed therein.

38. A power system as claimed in claim 37, wherein the ion exchange membrane fuel cell module has an anode and cathode current collector which are individually disposed in electrical contact with the opposite anode and cathode sides of each of the membrane electrode diffusion assemblies.

39. A power system as claimed in claim 38, wherein the ion exchange membrane fuel cell module further comprises:
 an anode heat sink disposed in heat receiving relation relative to the anode side of each membrane electrode diffusion assembly and which applies a force to each pair of current collectors and the membrane electrode diffusion assemblies disposed therebetween.

40. A power system as claimed in claim 39, wherein the ion exchange membrane fuel cell module further comprises:
 a bifurcated air flow comprising a cathode air stream and an anode heat sink air stream, and wherein less than a preponderance of the heat energy produced by the ion exchange membrane fuel cell module is removed by the cathode air stream.

41. A power system as claimed in claim 40, wherein the ion exchange membrane fuel cell module further comprises:
 an electrically nonconductive support member having opposite sides and defining individual cavities, and wherein the respective membrane electrode diffusion assemblies are individually sealably mounted in the respective cavities, and disposed in spaced relation relative to the nonconductive support member, and wherein the nonconductive support member is oriented between the respective membrane electrode diffusion assemblies, and wherein the cathode current collector is disposed in ohmic electrical contact with the cathode side of each of the membrane electrode diffusion assemblies, and wherein each of the cathode current collectors are individually associated with each of the cavities defined by the nonconductive support member and disposed substantially between the respective membrane electrode diffusion assemblies and the nonconductive support member;
 a pair of fuel distribution assemblies individually mounted in fluid flowing relation relative to the anode side of each of the membrane electrode diffusion assemblies, and wherein the anode current collector is disposed in ohmic electrical contact with the anode side of each membrane electrode diffusion assembly, and is juxtaposed relative to each of the fuel distribution assemblies; and the anode heat sink is mounted in heat receiving relation relative to each of the anodes to conduct heat energy generated by the ion exchange membrane fuel cell module away from the membrane electrode diffusion assembly.

42. A power system as claimed in claim 41, wherein the cathode current collector comprises a deformable member which orients the membrane electrode diffusion assembly in spaced relation relative to the underlying nonconductive support member and exerts a force on same, and wherein a cathode air passageway is created between the deformable member of the cathode current collector, membrane electrode diffusion assembly and the underlying nonconductive support member to facilitate the movement of air along the cathode side of the membrane electrode diffusion assembly, and wherein the cathode current collector, and the movement of air along the cathode side of the membrane electrode diffusion assembly dissipates heat energy generated by the membrane electrode diffusion assembly.

43. A power system as claimed in claim 42, wherein the fuel distribution assemblies are each coupled in fluid flowing relation with a dilute source of fuel and are operable to supply the dilute source of fuel to the anode side of each of the membrane electrode diffusion assemblies, and wherein each of the fuel distribution assemblies has a main body which defines an intake plenum, an exhaust plenum, and a cavity which is disposed intermediate the intake and exhaust plenums and which is coupled in fluid flowing relation relative thereto, and wherein the cavity formed in the respective fuel distribution assemblies substantially matingly cooperates with the individual cavities defined by the nonconductive support plate and operably receives the individual membrane electrode diffusion assemblies.

44. A power system as claimed in claim 43, wherein the fuel distribution assembly has inside and outside facing surfaces, and wherein the cavity extends through the main body and between the inside and outside facing surfaces, and wherein the outside facing surface of the fuel distribution assembly has a surface area, and the anode current collector lies in juxtaposed substantially covering relation over a preponderance of the surface area of the outside facing surface of the fuel distribution assembly and is disposed in ohmic electrical contact with the anode of the membrane electrode diffusion assembly that is received in the cavity defined by the fuel distribution assembly.

45. A power system as claimed in claim 44, wherein the anode current collector is substantially electrically isolated from the anode heat sink, and wherein the anode heat sink inhibits the formation of a temperature gradient across the active area of the membrane electrode diffusion assembly during operation of the ion exchange membrane fuel cell.

46. A power system as claimed in claim 45, wherein the individual ion exchange membrane fuel cell modules are releasably mounted on a subrack, and wherein the power system further comprises:

an air distribution plenum coupled in fluid flowing relation relative to each of the ion exchange membrane fuel cell modules, the air distribution plenum having an exhaust end which delivers an air stream to each of the ion exchange membrane fuel cell modules, and an opposite intake end which receives both air which has previously come into contact with each of the ion exchange membrane fuel cell modules, and air which comes from outside of the respective ion exchange membrane fuel cell modules; and an air mixing valve coupled to the air distribution plenum and which meters the amount of air which has passed through the respective ion exchange membrane fuel cell modules and is recirculated back to ion exchange membrane fuel cell module.

47. A power system as claimed in claim 46, and wherein the cathode air stream is supplied to the cathode air passageway, and wherein the anode heat sink stream passes over the anode heat sink and removes a preponderance of the heat energy generated by the ion exchange membrane fuel cell membrane, and wherein the air mixing valve is located downstream of the ion exchange membrane fuel module.

48. A power system as claimed in claim 47, which further comprises a DC bus, and wherein the anode and cathode current collectors are electrically coupled with the DC bus when the ion exchange membrane fuel cell modules are mounted on the subrack.

49. A power system as claimed in claim 48, wherein the power system further comprises:

a controller electrically coupled with each of the ion exchange membrane fuel cell modules.

50. A power system as claimed in claim 49, wherein the power system further comprises:

a power conditioning assembly for receiving the electrical power produced by each of the discrete ion exchange membrane fuel cell modules.

51. An ion exchange membrane fuel cell module, comprising:

a pair of membrane electrode diffusion assemblies disposed in spaced relation, one to the other, and wherein each membrane electrode diffusion assembly has an anode side, and an opposite cathode side, and wherein the cathode side of each membrane electrode diffusion assembly is proximally related, and the anode sides are distally related, and wherein each cathode side defines, in part, a bifurcated cathode air passageway.

52. An ion exchange membrane fuel cell module as claimed in claim 51, and further comprising:

a nonconductive support member disposed intermediate the pair of membrane electrode diffusion assemblies, and wherein the nonconductive support member has opposite sides which define discreet cavities, and wherein the opposite sides of the support member define, in part, the bifurcated cathode air passageway, and wherein the cathode side of each membrane electrode diffusion assembly faces one of the cavities defined by the nonconductive support member.

53. An ion exchange membrane fuel cell module as claimed in claim 52, and further comprising:

a cathode current collector received in each cavity defined by the nonconductive support member and disposed in ohmic electrical contact with the cathode side of the membrane electrode diffusion assembly, the cathode current collector having a plurality of resilient electrically conductive members which engage the cathode side of the membrane electrode diffusion assembly and orient it in spaced relation relative to the support member, the cathode current collector defining, in part, the bifurcated cathode air passageway and further conducting heat energy generated by the membrane electrode diffusion away from the membrane electrode diffusion assembly.

54. An ion exchange membrane fuel cell module as claimed in claim 53, and further comprising:
a fuel distribution assembly disposed in fluid flowing relation relative to the anode side of each membrane electrode diffusion assembly, and cooperating with the support member, and wherein the fuel distribution assembly is disposed in juxtaposed relation relative to the anode side of each membrane electrode diffusion assembly.

55. An ion exchange membrane fuel cell module as claimed in claim 54, and further comprising:
an anode current collector disposed in ohmic electrical contact with the anode side of each membrane electrode diffusion assembly, and which conducts away heat energy generated by the membrane electrode diffusion assembly, and wherein the fuel distribution assembly is disposed intermediate the anode side of each membrane electrode diffusion assembly and the anode current collector.

56. An ion exchange membrane fuel cell module, as claimed in claim 55, and further comprising:
an anode heat sink disposed in heat removing relation relative to the membrane electrode diffusion assembly and which is substantially electrically isolated from the anode current collector, and oriented in heat receiving relation relative thereto, and wherein the membrane electrode diffusion assembly generates heat energy and the anode heat sink removes a preponderance of the heat energy generated by the membrane electrode diffusion assembly.

57. An ion exchange membrane fuel cell module, as claimed in claim 56, wherein the bifurcated cathode air passageway receives a cathode air stream, and wherein less than a preponderance of the heat energy produced by the ion exchange membrane fuel cell module is removed by way of the cathode air stream.

58. An ion exchange membrane fuel cell module, as claimed in claim 57, and further comprising:
an air distribution plenum coupled in fluid flowing relation relative to the ion exchange membrane fuel cell module, the air distribution plenum having an intake end and an opposite exhaust end, and wherein the air distribution plenum delivers a bifurcated air stream which comprises the cathode air stream, and an anode heat sink stream, and wherein the intake end receives the cathode air stream which has passed through the bifurcated cathode air passageway, and air which comes from outside the ion exchange membrane fuel cell module; and
an air mixing valve coupled in fluid metering relation to the air distribution plenum to control the amount of outside air and the previous cathode air stream delivered to the ion exchange membrane fuel cell module.

59. An ion exchange membrane fuel cell module as claimed in claim 58, and further comprising:
a subrack for releasably supporting the ion exchange membrane fuel cell module in an operable orientation;
a DC bus mounted operatively adjacent the subrack, and wherein the DC bus is electrically coupled with the anode and cathode current collectors when the ion exchange membrane fuel cell module is operatively oriented on the subrack; and wherein the intake end of the air distribution plenum is disposed in fluid flowing relation relative to the ion exchange membrane fuel cell module when it is operatively oriented on the subrack.

60. An ion exchange membrane fuel cell module as claimed in claim 59, and further comprising:
a controller electrically coupled with the ion exchange membrane fuel cell module; and
a power conditioning assembly electrically coupled with the DC bus and the controller and which is operable to receive the electrical power produced by the ion exchange membrane fuel cell module.

61. An ion exchange membrane fuel cell module, comprising:
a pair of membrane electrode diffusion assemblies each having opposite anode and cathode sides;
anode and cathode current collectors electrically coupled with the opposite anode and cathode sides of the membrane electrode diffusion assembly;
a support member disposed between the pair of membrane electrode diffusion assemblies, and wherein the cathode side of each membrane electrode diffusion assembly faces the support member;
a cathode air passageway defined between the support member and the cathode side of each of the membrane electrode diffusion assemblies;
a fuel distribution assembly coupled in fluid flowing relation relative to the anode side of each membrane electrode diffusion assembly; and
an anode heat sink oriented in heat receiving relation relative to each anode.

62. An ion exchange membrane fuel cell module as claimed in claim 61, wherein the support member has a main body with opposite first and second ends, and opposite sides which define individual cavities, and wherein the cathode side of each membrane electrode diffusion assembly is mounted in the cavity and oriented in spaced relation relative to the support member, and wherein the cathode current collector is received in each cavity and disposed between the support member and the cathode side of each membrane electrode diffusion assembly, and wherein the cathode current collector positions the cathode side of the membrane electrode diffusion assembly in spaced relation relative to the support member, and wherein the cathode side of each membrane electrode diffusion assembly, the cathode current collector, and the support member define the cathode air passageway which extends between the first and second end of the support member.

63. An ion exchange membrane fuel cell module as claimed in claim 62, wherein the fuel distribution assembly is oriented between the membrane electrode diffusion assembly and the anode current collector, and wherein the anode current collector is disposed in ohmic electrical contact with the anode of the membrane electrode diffusion assembly, and wherein the anode current collector is substantially electrically isolated from the anode heat sink, and wherein the anode side has a plurality of interconnecting channels which are formed therein.

64. An ion exchange membrane fuel cell module, as claimed in claim 63, and further comprising:
an air distribution plenum coupled in fluid flowing relation relative to the ion exchange membrane fuel cell module, the air distribution plenum having an intake end and an opposite exhaust end, and wherein the air distribution plenum delivers an air stream which is bifurcated the fuel cell module, and wherein the bifurcated air stream comprises a cathode air stream which is delivered to the cathode air passageway, and an anode heat sink air stream which passes over the anode heat sink to conduct heat away from the anode heat sink, and wherein the intake end receives the cathode air stream which has passed through the cathode air passageway, and the air which comes from outside the ion exchange membrane fuel cell module; and an air mixing valve coupled in fluid metering relation relative to the air distribution plenum to control the percentage of outside air and the previous cathode air stream delivered to the ion exchange membrane fuel cell module.

65. An ion exchange membrane fuel cell module as claimed in claim 64, and further comprising:

a subrack for releasably supporting the ion exchange membrane fuel cell module in an operable orientation;

a DC bus mounted operatively adjacent the subrack, and which is electrically coupled with the anode and cathode current collectors when the ion exchange membrane fuel cell module is operatively oriented on the subrack; and wherein the intake end of the air distribution plenum is disposed in fluid flowing relation relative to the ion exchange membrane fuel cell module when it is operatively oriented on the subrack.

66. An ion exchange membrane fuel cell module as claimed in claim 65, and further comprising:

a controller electrically coupled with the ion exchange membrane fuel cell module; and a power conditioning assembly electrically coupled with the DC bus and the controller and which is operable to receive the electrical power produced by the ion exchange membrane fuel cell module.

67. An ion exchange membrane fuel cell module, comprising:

a support member having opposite sides and which defines opposing cavities;

a cathode current collector received in each of the cavities defined by the support member;

a membrane electrode diffusion assembly matingly received in each of the cavities, and having opposite anode and cathode sides, and wherein the cathode side of the individual membrane electrode diffusion assembly cooperates with each cavity, and the cathode current collector lies in ohmic electrical contact with the cathode side of the membrane electrode diffusion assembly;

a fuel distribution assembly cooperating with the support member and disposed in fluid flowing relation relative to the anode side of each of the membrane electrode diffusion assemblies;

an anode current collector disposed in ohmic electrical contact with the anode side of each of the membrane electrode diffusion assemblies, and wherein the fuel distribution assembly is disposed between the membrane electrode diffusion assembly and the anode current collector; and an anode heat sink disposed in heat removing relation relative to the membrane electrode diffusion assembly, and wherein the ion exchange membrane fuel cell module has a bifurcated air flow comprising a cathode air stream which passes into contact with the cathode side of the membrane electrode diffusion assembly, and an anode air stream which passes into heat receiving relation relative to the anode heat sink, and wherein heat energy generated by the membrane electrode diffusion assembly is dissipated from the anode heat sink to the anode air stream.

68. An ion exchange membrane fuel cell module as claimed in claim 67, wherein the support member is fabricated from a dielectric material, and wherein the individual cavities are formed in the opposite sides of the support member, and wherein the cathode current collector, the cathode side of the membrane electrode diffusion assembly and the nonconductive support member define a cathode air passageway which facilitates the delivery of the cathode air stream to the cathode side of the membrane electrode diffusion assembly.

69. An ion exchange membrane fuel cell module as claimed in claim 58, wherein the cathode current collector has a plurality of resilient electrically conductive members which orient the cathode side of the membrane electrode diffusion assembly in spaced relation relative to the underlying support member, and further conducts away heat which is generated by the membrane electrode diffusion assembly, and wherein the membrane electrode diffusion assembly is substantially sealably mounted in the cavity.

70. An ion exchange membrane fuel cell module as claimed in claim 69, wherein the fuel distribution assembly is substantially electrically isolated from the anode heat sink.

71. An ion exchange membrane fuel cell module, comprising:

a dielectric support member defining opposed cavities;

a cathode current collector received in each cavity;

a membrane electrode diffusion assembly having opposite anode and cathode sides and which is received in each cavity, and wherein the cathode side is positioned in spaced relation relative to the support member by the cathode current collector to define a cathode air passageway therebetween;

a fuel distribution assembly disposed in fuel dispensing relation relative to the anode side of the membrane electrode diffusion assembly;

an anode current collector electrically coupled with the anode side of the membrane electrode diffusion assembly; and an anode heat sink disposed in heat removing relation relative to the membrane electrode diffusion assembly and electrically isolated from the anode current collector.

72. An ion exchange membrane fuel cell module, as claimed in claim 71, wherein the support member has a main body having opposite first and second ends, and wherein the cathode air passageway defined in each cavity extends between the opposite ends, and wherein the respective cathode air passageways are substantially parallel one to the other.

73. An ion exchange membrane fuel cell module, as claimed in claim 72, wherein each current collector has a plurality of resilient electrically conductive members which orient the membrane electrode diffusion assembly in spaced relation to the support member, and wherein the cathode current collector further includes a conductive contact member which extends outwardly from the cavity at the first end of support member.

74. An ion exchange membrane fuel cell module, as claimed in claim 73, wherein the fuel distribution assembly is disposed in juxtaposed relation relative to the anode side of the membrane electrode diffusion assembly, and wherein the anode side has formed therein a plurality of interlocking channel which receive the fuel delivered by the fuel distribution assembly.

75. A proton exchange membrane fuel cell module, as claimed in claim 73, wherein the anode current collector is disposed in ohmic electrical contact with anode side of the membrane electrode diffusion assembly, and wherein anode current collector further has a contact member which extends outwardly relative to the first end of the support member and is further disposed in substantially spaced parallel relation relative to the contact member of the cathode current collector.

76. An ion exchange fuel cell comprising:
   an ion exchange fuel cell membrane having opposite anode and cathode sides;
   a fuel supply provided to the anode side; and
   an oxidant supply comprising ambient air provided to the cathode, and wherein the air is supplied in a cathode stream which has a volume of at least about 5 to about 1,000 times the volume required to support a fuel cell chemical reaction which produces water vapor as a byproduct, and wherein the fuel cell chemical reaction produces heat as a byproduct and wherein the cathode air stream removes less than a preponderance of the heat produced by the fuel cell chemical reaction.

77. An ion exchange fuel cell comprising:
   an ion exchange fuel cell membrane having opposite anode and cathode sides;
   a fuel supply provided to the anode side; and
   an oxidant supply supplied to the cathode side in a volume of at least 5 times the volume required to support a fuel cell chemical reaction which produces heat as byproduct, and wherein the ion exchange membrane is enclosed within a fuel cell module, and wherein the fuel cell module further comprises an anode heat sink which removes a preponderance of the heat produced by the fuel cell chemical reaction.

78. An ion exchange fuel cell comprising:
   an ion exchange fuel cell membrane having opposite anode and cathode sides, and which is enclosed within a fuel cell module;
   a fuel supply provided to the anode side;
   an oxidant supply comprising ambient air provided to the cathode side in a cathode air stream which has a volume of at least 5 times the volume required to support a fuel cell chemical reaction which produces heat and water vapor as byproducts; and
   an anode heat sink disposed in heat removing relation relative to the anode; and wherein the ion exchange membrane fuel cell module is coupled with a subrack, and wherein the subrack further has an air distribution plenum coupled in fluid flowing relation with the ion exchange fuel cell module, and wherein the cathode air stream delivered to the ion exchange fuel cell module by the air distribution plenum is humidified in part, by the water vapor generated by the chemical reaction.

79. An ion exchange fuel cell as claimed in claim 78, wherein the cathode air stream delivered to the ion exchange fuel cell module is recirculated back to the ion exchange fuel cell module, and wherein the air distribution plenum further comprises an air mixing valve which facilitates the addition of fresh ambient air to the recirculated cathode air stream, the selective combination of the recirculated cathode air stream and the fresh ambient air forming a cathode air stream having a substantially stable operating temperature.

80. An ion exchange membrane fuel cell comprising:
   a membrane electrode diffusion assembly having opposite anode and cathode sides, and which, during operation, generates electricity and produces heat energy as a byproduct; and
   a cathode current collector which rests in ohmic electrical contact with the cathode side of the membrane electrode diffusion assembly, and conducts, in part, the heat energy generated by the membrane electrode diffusion assembly away from the membrane electrode diffusion assembly, and wherein the cathode current collector defines, in part, a cathode air passageway, and wherein the ion exchange membrane fuel cell further comprises a bifurcated air flow, and wherein a first portion of the bifurcated air flow is provided to the cathode air passageway and facilitates the removal of less than a preponderance of the heat generated by the membrane electrode diffusion assembly.

81. An ion exchange membrane fuel cell as claimed in claim 80, and further comprising an anode heat sink which is disposed in heat receiving relation relative to the anode side of membrane electrode diffusion assembly, and wherein a second portion of the bifurcated air flow is provided to the anode heat sink and which facilitates the removal of a preponderance of the heat generated by the membrane electrode diffusion assembly.

82. An ion exchange membrane fuel cell as claimed in claim 81, and further comprising:
   an anode current collector resting in ohmic electrical contact with the anode side of the membrane electrode diffusion assembly; and
   a fuel distribution assembly disposed in fuel dispensing relation relative to the anode side of membrane electrode diffusion assembly, and which is disposed therebetween the anode current collector and the anode heat sink.

83. An ion exchange membrane fuel cell as claimed in claim 82, wherein the membrane electrode diffusion assembly has an active area defined by a surface area, and which produces an average current density of at least about 350 mA per square centimeter of surface area when supplied with a fuel by the fuel distribution assembly at a nominal voltage of at least about 0.5 volts.

84. An ion exchange membrane fuel cell as claimed in claim 55, wherein the fuel cell can be manipulated by hand, and wherein the fuel includes hydrogen, and wherein the concentration of the hydrogen in the fuel is about 30% to about 80%.

85. An ion exchange membrane fuel cell comprising;
   an ion exchange membrane having opposite anode and cathode sides;
   a fuel supply provided to the anode side;
   an oxidant supply provided to the cathode side, and wherein the oxidant supply is provided in a cathode stream which has a volume of at least 5 times the volume required to support a chemical reaction which produces heat as a byproduct; and
   an anode heat sink disposed in heat removing relation relative to the anode, and which removes, in part, the heat energy generated during operation of the fuel cell.

86. An ion exchange membrane fuel cell as claimed in claim 85, and wherein the oxidant supply is ambient air, and wherein the oxidant supply removes less than a preponderance of the heat produced by the fuel cell reaction.

87. An ion exchange membrane fuel cell as claimed in claim 85, and wherein the anode heat sink removes a preponderance of the heat produced by the fuel call reaction.

88. An ion exchange membrane fuel cell comprising:
   a membrane electrode diffusion assembly having opposite anode and cathode sides and which produces heat during operation; and
   an anode heat sink disposed in heat removing relation relative to the anode to regulate the temperature of the fuel cell during operation.

89. An ion exchange membrane fuel cell as claimed in claim 88, and wherein the anode heat sink removes a preponderance of the heat produced.

90. An ion exchange membrane fuel cell as claimed in claim 88, and wherein the fuel cell has an oxidant supply provided to the cathode and which further removes less than a preponderance of the heat produced.

91. An ion exchange membrane fuel cell comprising:

a membrane electrode diffusion assembly having opposite anode and cathode sides and which produces heat during operation; and a bifurcated airflow provided to the ion exchange membrane fuel cell and which regulates the operational temperature of the ion exchange membrane fuel by removing the heat therefrom.

92. An ion exchange membrane fuel cell as claimed in claim 91, and further comprising:

an anode heat sink disposed in heat removing relation relative to the anode, and wherein a portion of bifurcated airflow passes over the anode heat sink and removes heat therefrom.

93. An ion exchange membrane fuel cell comprising:

a pair of membrane electrode diffusion assemblies each having opposite anode and cathode sides, and wherein the pair of membrane electrode diffusion assemblies each produce heat energy during operation, and wherein the pair of membrane electrode diffusion assemblies are oriented such that the cathode sides are proximally related, and the anode sides are distally related, and wherein ion exchange membrane fuel cell has an oxidant supply delivered to the cathode sides of each membrane electrode diffusion assembly, and wherein the oxidant supply further operates to regulate, in part, the operational temperature of the fuel cell by dissipating a portion of the heat generated during fuel cell operation.

94. An ion exchange membrane fuel cell as claimed in claim 93, and further comrpising:

an anode heat sink disposed in heat removing relation relative to each of the anode sides.

* * * * *

UNITED STATES PATENT AND TRADEMARK OFFICE
CERTIFICATE OF CORRECTION

PATENT NO. : 6,468,682 B1
DATED : October 22, 2002
INVENTOR(S) : William A. Fuglevand et al.

It is certified that error appears in the above-identified patent and that said Letters Patent is hereby corrected as shown below:

<u>Title page</u>,
Item [75], Inventors, replace "Glen Alden Lloyd" with -- Greg A. Lloyd --.

<u>Column 26</u>,
Line 8, replace "claim 58," with -- claim 68, --.

<u>Column 28</u>,
Line 37, replace "claim 55," with -- claim 83, --.
Line 60, replace "fuel call reaction." with -- fuel cell reaction. --.

Signed and Sealed this

Ninth Day of September, 2003

JAMES E. ROGAN
*Director of the United States Patent and Trademark Office*